United States Patent
Kasahara et al.

(10) Patent No.: US 10,296,134 B2
(45) Date of Patent: *May 21, 2019

(54) INFORMATION PROCESSOR, INFORMATION PROCESSING METHOD, AND COMPUTER PROGRAM

(71) Applicant: SONY CORPORATION, Tokyo (JP)

(72) Inventors: Shunichi Kasahara, Tokyo (JP); Kazuyuki Yamamoto, Tokyo (JP); Ritsuko Kano, Tokyo (JP); Tomoya Narita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,147

(22) Filed: May 2, 2017

(65) Prior Publication Data

US 2017/0235417 A1    Aug. 17, 2017

Related U.S. Application Data

(63) Continuation of application No. 14/594,736, filed on Jan. 12, 2015, now Pat. No. 9,671,897, which is a
(Continued)

(30) Foreign Application Priority Data

Sep. 7, 2010   (JP) ................. 2010-199638

(51) Int. Cl.
G06F 3/041     (2006.01)
G06F 3/0488    (2013.01)
(Continued)

(52) U.S. Cl.
CPC ............ *G06F 3/0416* (2013.01); *G06F 3/044* (2013.01); *G06F 3/0484* (2013.01);
(Continued)

(58) Field of Classification Search
CPC .... G06F 3/0416; G06F 3/044; G06F 3/04845; G06F 3/04883; G06F 2203/04108
(Continued)

(56) References Cited

U.S. PATENT DOCUMENTS 8,232,990 B2 * 7/2012 King ................... G06F 3/04883
                                                  341/20
2006/0209037 A1  9/2006 Wang et al.
(Continued)

FOREIGN PATENT DOCUMENTS

JP      09-218745      8/1997
JP      11-259202      9/1999
(Continued)

OTHER PUBLICATIONS

Combined Chinese Office Action and Search Report dated Jan. 29, 2018 in Patent Application No. 201610049390.0 (with English language translation).
(Continued)

*Primary Examiner* — Nelson M Rosario
(74) *Attorney, Agent, or Firm* — Xsensus LLP

(57) ABSTRACT

An information processing apparatus including a detector that detects movement of a manipulation body in a vertical direction in relation to a display, and a processor that determines a speed of movement of the manipulation body based on an output of the detector, and determines a process to be executed based on the determined speed of movement.

16 Claims, 23 Drawing Sheets

Related U.S. Application Data continuation of application No. 14/264,691, filed on Apr. 29, 2014, now Pat. No. 8,952,931, which is a continuation of application No. 13/220,207, filed on Aug. 29, 2011, now Pat. No. 8,736,575.

(51) Int. Cl.
*G06F 3/044* (2006.01)
*G06F 3/0484* (2013.01)

(52) U.S. Cl.
CPC ...... *G06F 3/04845* (2013.01); *G06F 3/04883* (2013.01); *G06F 3/041* (2013.01); *G06F 2203/04108* (2013.01)

(58) Field of Classification Search
USPC ....... 345/173, 174, 175, 176, 177, 179, 679, 345/680, 684; 715/763, 764, 174, 175, 715/176, 177, 179, 679, 680, 684
See application file for complete search history.

(56) References Cited

U.S. PATENT DOCUMENTS

| | | | |
|---|---|---|---|
| 2009/0106655 | A1 | 4/2009 | Grant et al. |
| 2010/0095206 | A1 | 4/2010 | Kim |
| 2010/0107099 | A1 | 4/2010 | Frazier et al. |
| 2010/0245237 | A1 | 9/2010 | Nakamura |
| 2011/0057880 | A1 | 3/2011 | Kasahara |
| 2011/0298704 | A1 | 12/2011 | Krah |
| 2011/0316679 | A1 | 12/2011 | Pihlaja |
| 2012/0068760 | A1 | 3/2012 | Caldwell et al. |
| 2012/0068941 | A1 | 3/2012 | Arrasvuori et al. |
| 2012/0212442 | A1 | 8/2012 | Uchida et al. |
| 2014/0198024 | A1* | 7/2014 | Adzhigirey ......... G06F 3/04815 345/156 |

FOREIGN PATENT DOCUMENTS

| | | |
|---|---|---|
| JP | 2004-258766 | 9/2004 |
| JP | 2006-103364 | 4/2006 |
| JP | 2009-217465 | 9/2009 |
| JP | 2010-506302 | 2/2010 |
| JP | 2010-067135 | 3/2010 |
| JP | 2010-146386 | 7/2010 |

OTHER PUBLICATIONS

Office Action dated Oct. 21, 2014 in Japanese Patent Application No. 2010-199638.
Combined Chinese Office Action and Search Report dated Jul. 9, 2015 in Patent Application No. 201110259921.6 (with English language translation).

* cited by examiner

FIG. 20
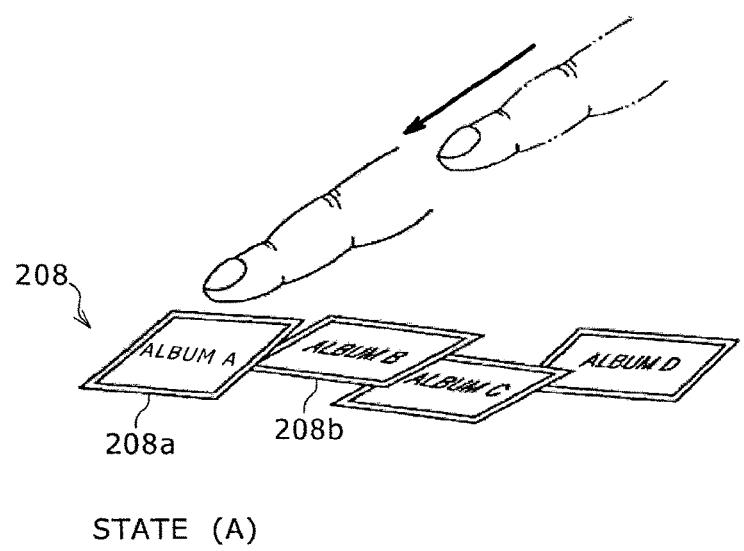
STATE (A)
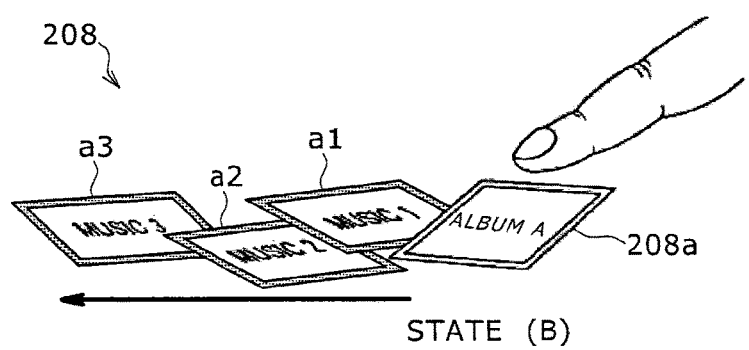
STATE (B)

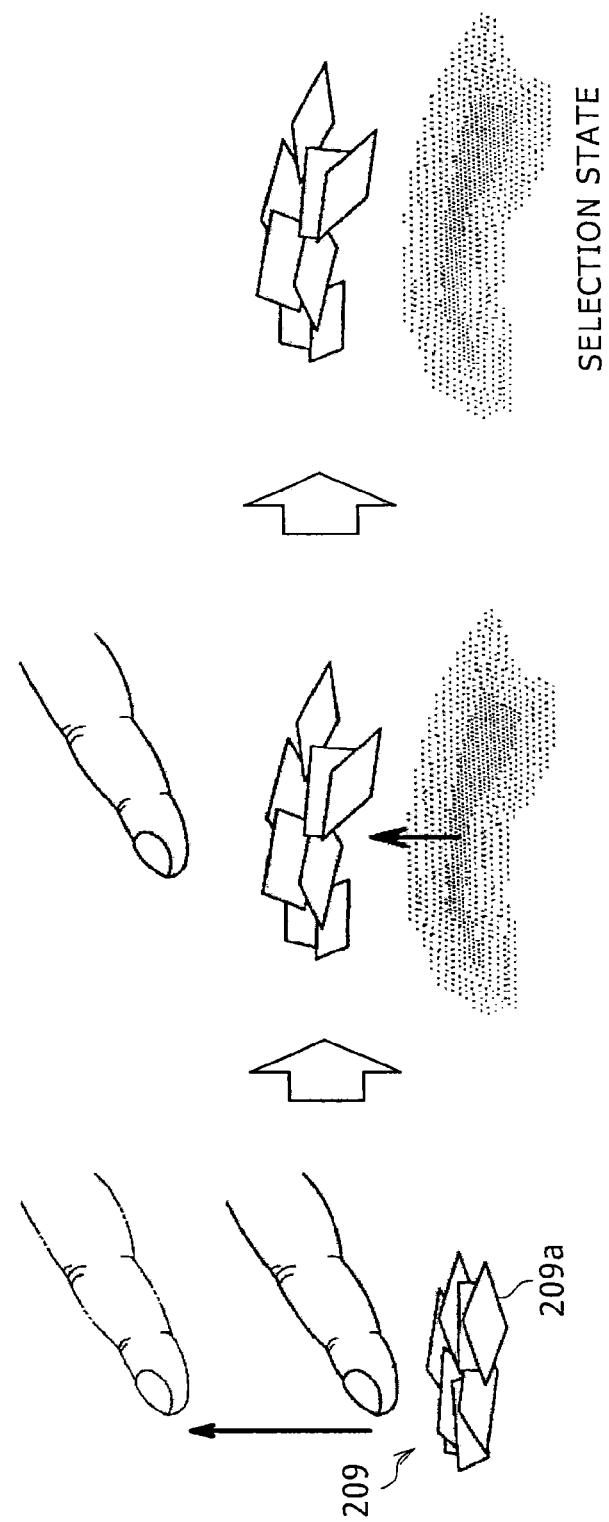

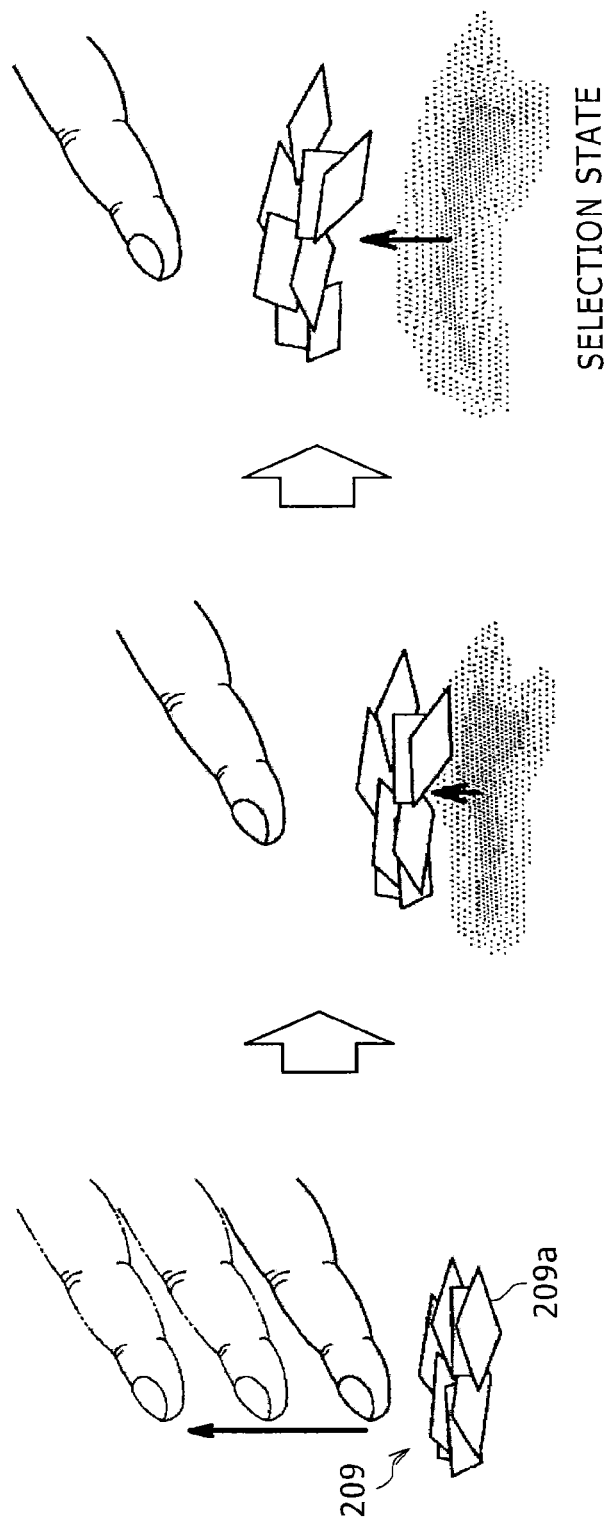

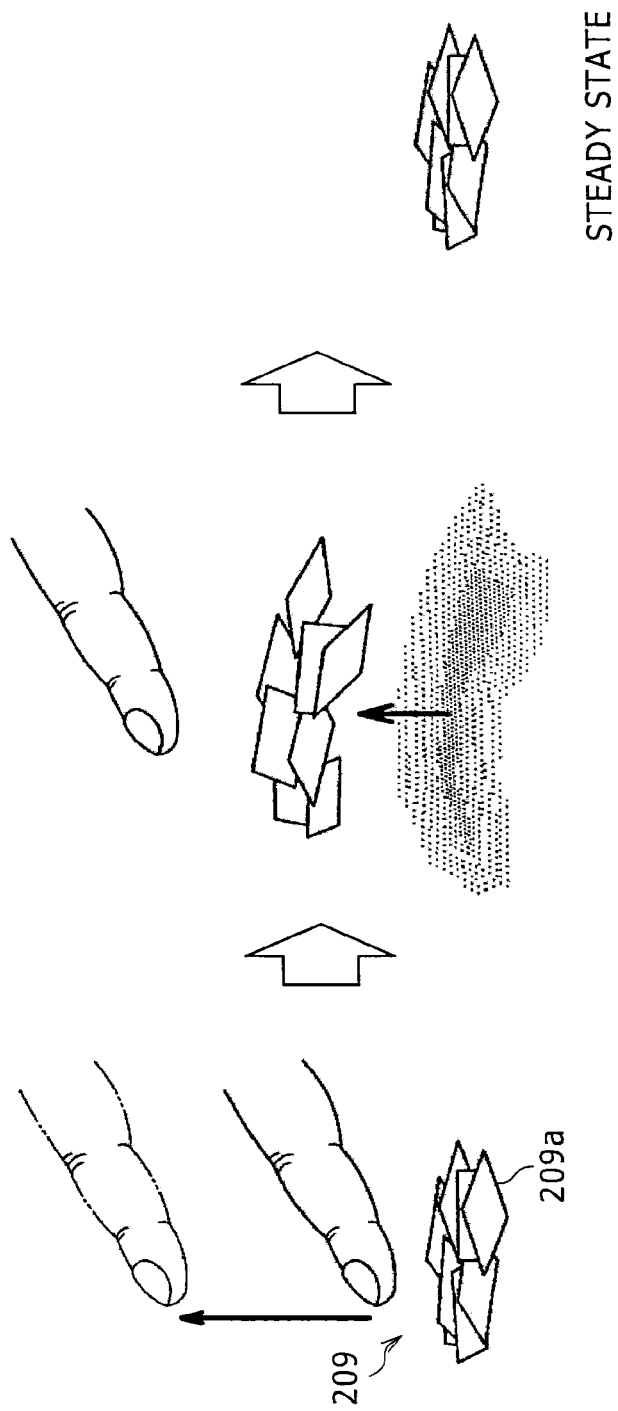

INFORMATION PROCESSOR, INFORMATION PROCESSING METHOD, AND COMPUTER PROGRAM

CROSS REFERENCE TO RELATED APPLICATIONS

This application is a continuation of and is based upon and claims the benefit of priority under 35 U.S.C. § 120 of U.S. Ser. No. 14/594,736, filed Jan. 12, 2015, which is a continuation of U.S. Ser. No. 14/264,691, filed Apr. 29, 2014 (now U.S. Pat. No. 8,952,931) which is a continuation of U.S. Ser. No. 13/220,207, filed Aug. 29, 2011 (now U.S. Pat. No. 8,736,575) and claims the benefit of priority under 35 U.S.C. § 119 to Japanese Patent Application JP 2010-199638 filed in the Japan Patent Office on Sep. 7, 2010, the entire content of each of which is hereby incorporated by reference.

BACKGROUND

The present disclosure relates to an information processor, an information processing method, and a computer program. More particularly, the disclosure relates to an information processor for executing manipulation controlling processing for a GUI, an information processing method, and a computer program.

Since a touch panel can realize a user interface (hereinafter also referred to as "a UI" for short) which is intuitive and easy to use, heretofore, the touch panel has been used in ticketing devices of transport facilities, ATMs of banks, and the like. In recent years, the touch panel has come to detect an operation made by a user, and thus have come to realize different manipulations for an apparatus than other manipulations made by using existing buttons. As a result, in recent years, the touch panel has been frequently used in portable apparatuses such as a mobile phone and a game apparatus. For example, JP-T-2010-506302 discloses an apparatus which starts tactile sensation feedback before a user comes in contact with an input area of a touch panel or the like based on presence of an object lying in the vicinity of the input area of the apparatus, thereby generating a tactile effect on the apparatus.

SUMMARY

However, with the existing touch panel, information on a finger of the user which can be detected by the touch panel was obtained only from a state of the finger of the user contacting the touch panel. For this reason, it might be impossible to manipulate the apparatus until the finger of the user came in contact with the touch panel. In addition, the user could not recognize what kind of processing was executed by causing the finger to come in contact with the touch panel until the user came in contact with the touch panel with his/her finger.

In addition, with the existing touch panel, only the state of the finger touching the touch panel could be detected. Therefore, when the manipulation was carried out with the touch panel, it was difficult to measure how fast the finger came in contact with the touch panel. Likewise, it was also difficult to measure how fast the finger got away from the touch panel. That is to say, heretofore, it was merely possible to detect whether or not the finger came in contact with the touch panel. Thus, there was such a restriction that the apparatus needed to be manipulated by carrying out the input manipulation which could be determined from such a detection result.

The present disclosure has been made in order to solve the problems described above, and it is therefore desirable to provide a novel and improved information processor which is capable of giving variety to an input manipulation in a touch panel, an information processing method, and a computer program.

According to one exemplary embodiment, the disclosure is directed to an information processing apparatus including a detector that detects movement of a manipulation body in a vertical direction in relation to a display, and a processor that determines a speed of movement of the manipulation body based on an output of the detector, and determines a process to be executed based on the determined speed of movement.

According to another exemplary embodiment, the disclosure is directed to an information processing method performed by an information processing apparatus, the method comprising: detecting, by a detector of the information processing apparatus, movement of a manipulation body in a vertical direction in relation to a display; determining, by a processor of the information processing apparatus, a speed of movement of the manipulation body based on an output of the detector; and determining, by the processor, a process to be executed based on the determined speed of movement.

According to another exemplary embodiment, the disclosure is directed to a non-transitory computer-readable medium including computer program instructions, which when executed by an information processing apparatus, cause the information processing apparatus to perform an information processing method comprising: detecting movement of a manipulation body in a vertical direction in relation to a display; determining a speed of movement of the manipulation body based on an output of the detector; and determining a process to be executed based on the determined speed of movement.

As set forth hereinabove, according to the present disclosure, it is possible to provide the information processor which is capable of giving the variety to the input manipulation in the touch panel, the information processing method, and the computer program.

BRIEF DESCRIPTION OF THE DRAWINGS

FIG. 20 is an explanatory view explaining another example of processing for acquiring the information on the direction in which the user taps the display surface with his/her finger from the position information, and determining the processing to be executed in accordance with the tapping direction;

FIG. 22 is an explanatory view explaining another example of processing for changing the display expression in the phase of selection of the object by utilizing the movement speed of the finger when the finger is released from the display surface;

FIG. 23 is an explanatory view explaining still another example of processing for changing the display expression in the phase of selection of the object by utilizing the movement speed of the finger when the finger is released from the display surface; and FIG. 24 is an explanatory view explaining yet another example of processing for changing the display expression in the phase of selection of the object by utilizing the movement speed of the finger when the finger is released from the display surface.

DETAILED DESCRIPTION OF THE PREFERRED EMBODIMENTS

Figure 1:
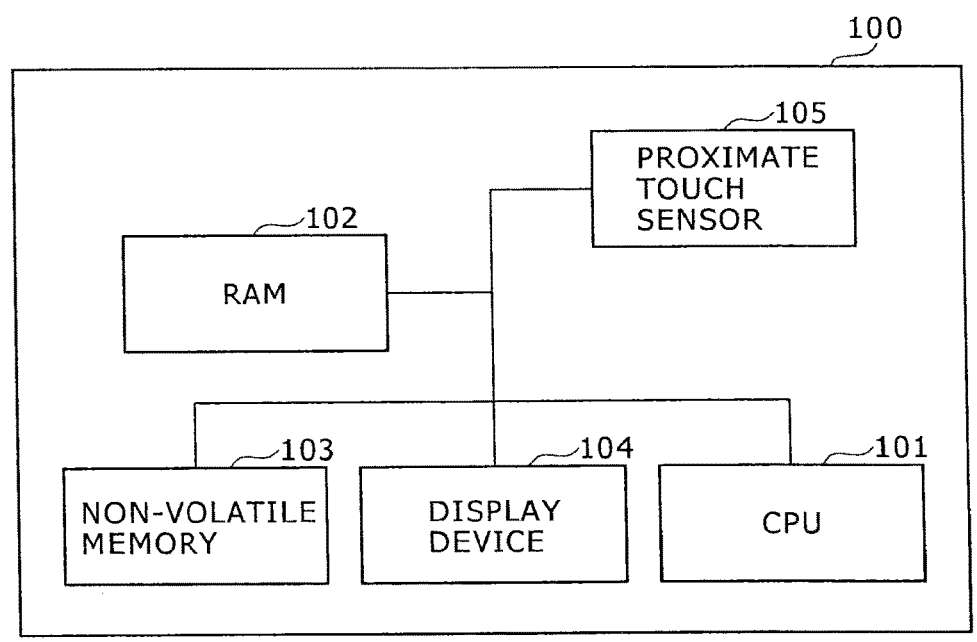
FIG. 1 is a block diagram showing a hardware configuration of an information processor according to a first embodiment of the present disclosure.

Embodiments of the present disclosure will be described in detail hereinafter with reference to the accompanying drawings. It is noted that in the description and the drawings, constituent elements having substantially the same functions and configurations are designated with the same reference numerals, respectively, and a repeated description thereof is omitted here for the sake of simplicity.

It is noted that the description will be given below in accordance with the following order:

1. Outline of Information Processor;
2. Function and Configuration of Information Processor;
3. Object Manipulation Controlling Processing Using Movement Speed Information; and
4. Variation.

1. Outline of Information Processor

Hardware Configuration

Figure 2:
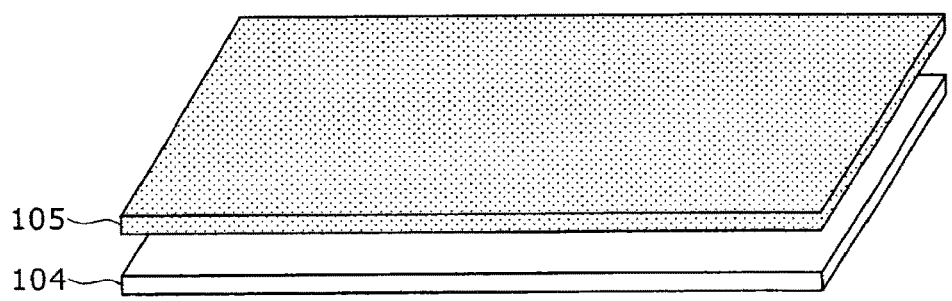
FIG. 2 is an explanatory perspective view showing a hardware structure of the information processor according to the first embodiment of the present disclosure.

Firstly, a hardware configuration of an information processor according to a first embodiment of the present disclosure will be described with reference to FIGS. 1 and 2. Note that, FIG. 1 is a block diagram showing a hardware configuration of an information processor 100 according to the first embodiment of the present disclosure. FIG. 2 is an explanatory perspective view showing a hardware structure of the information processor 100 according to the first embodiment of the present disclosure.

The information processor 100 of the first embodiment is an apparatus including a detecting portion. In this case, the detecting portion can detect a contact position of a manipulation body on a display surface of a display device, and also can detect a proximate distance between the display surface of the display device, and the manipulation body located above the display surface. Various apparatuses such as an apparatus including a small display device such as a personal digital assistance or a smart phone are supposed as the information processor 100 irrespective of the functions of the apparatuses. Further, the exemplary embodiments discussed below show the manipulation body as being a user's finger. However, the manipulation body may also be any device used to input operations to the apparatuses outlined above, such as a pen, stylus or any other similarly configured input instrument.

The information processor 100 of the first embodiment, as shown in FIG. 1, includes a CPU 101, a Random Access Memory (RAM) 102, a non-volatile memory 103, a display device 104, and a proximate touch sensor 105.

The CPU 101 functions as an arithmetic operation processing unit and a controller, and controls an overall operation of the information processor 100 in accordance with various kinds of programs. In addition, the CPU 101 may also be a microprocessor. The RANI 102 temporarily stores therein a program which the CPU 101 uses in execution in the CPU 101, parameters which are suitably changed in the execution in the CPU 101, and the like. The CPU 101, the RAM 102, the non-volatile memory 103, the display device 104, and the proximate touch sensor 105 are connected to one another through a host bus composed of a CPU bus or the like. The non-volatile memory 103 stores therein a program, arithmetic operation parameters and the like which the CPU 101 uses. A Read Only Memory (ROM), a flash memory or the like, for example, can be used as the non-volatile memory 103.

The display device 104 is an example of an output device for outputting information. A Liquid Crystal Display (LCD) device, an Organic Light Emitting Diode (OLED) device, or the like, for example, can be used as the display device 104. The proximate touch sensor 105 is an example of an input device with which a user inputs information. Also, the proximate touch sensor 105 is composed of an input section through which information is inputted, an input control circuit, and the like. In this case, the input control circuit generates an input signal in accordance with an input manipulation made by the user and outputs the input signal thus generated to the CPU 101.

In the information processor 100 of the first embodiment, as shown in FIG. 2, the proximate touch sensor 105 is provided by being laminated on a display surface of the display device 104. As a result, when the user moves his/her finger or the like closer to the display surface of the display device 104, a distance between the display surface and the finger can be detected by the proximate touch sensor 105.
Input of Manipulation Information to Information Processor In such an information processor 100, when the user moves a manipulation body such as his/her finger closer to the display surface of the display device 104, the proximate distance between the display surface and the manipulation body is detected by the proximate touch panel 105. The information processor 100 changes a display form of information being displayed on the display device 104 in accordance with this proximate distance. In this case, the information processor 100 of the first embodiment acquires how fast the finger either comes in contact with the proximate touch panel 105 or comes to get away from the proximate touch panel 105 as movement speed information. Also, the information processor 100 of the first embodiment gives additional information to an input manipulation in accordance with the movement speed information. As a result, the variety can be given to the input manipulation made by using the proximate touch panel 105.

Figure 3:
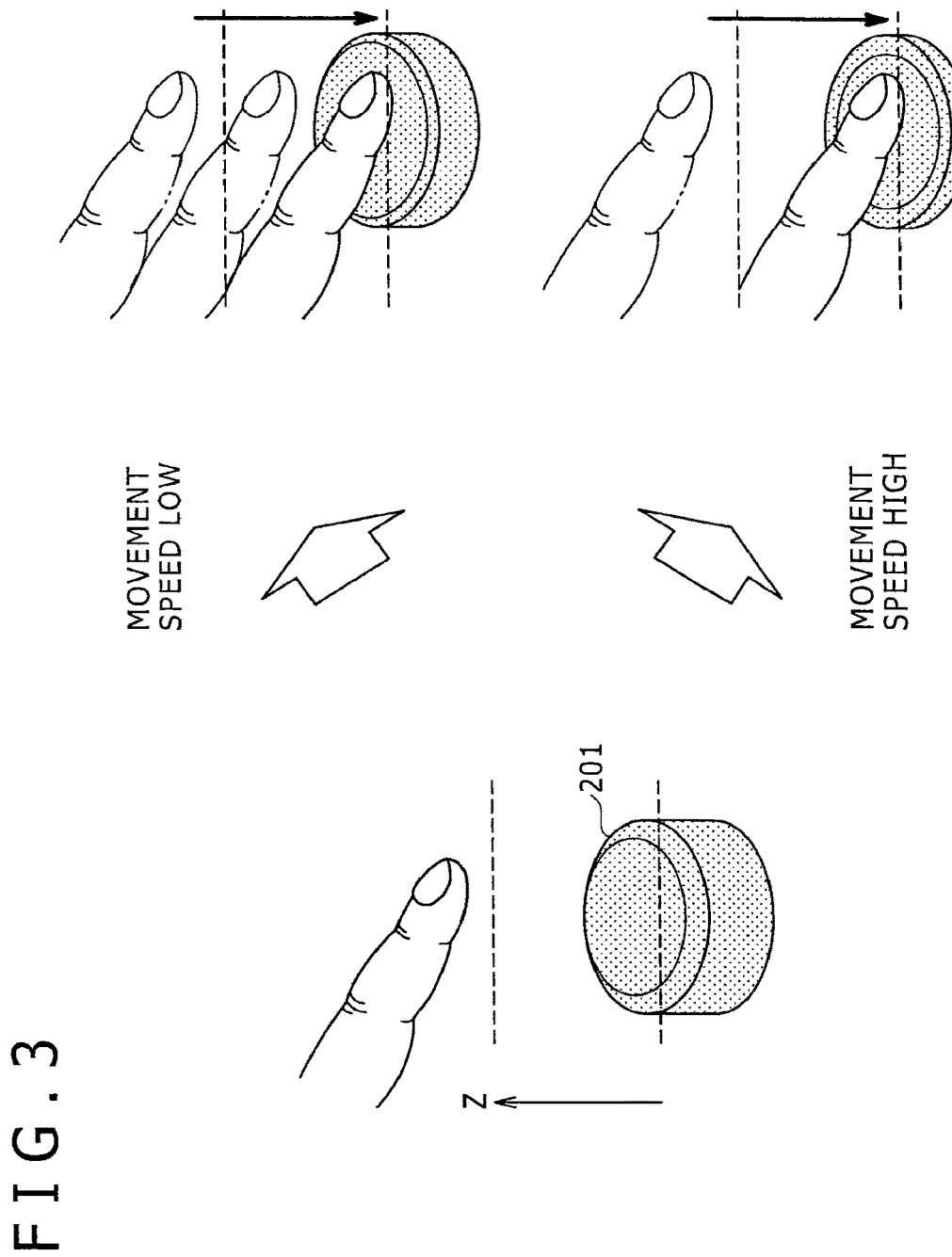
FIG. 3 is an explanatory view showing a change in display expression of an object when an amount of deformation of the object is changed in accordance with a movement speed of a finger.

For example, as shown in FIG. 3, it is assumed that a GUI of a button 201 is displayed on the display device 104. When the proximate touch panel 105 detects that the finger has come in contact with the display surface of the display device 104, the information processor 100 changes the display expression in such a way that the button 201 is crushed by a depressing force of the finger. In this case, the information processor 100 changes the display expression in such a way that an amount of crushing of the button 201 (that is, an amount of deformation) becomes small when the movement speed of the finger is lower than a predetermined speed, and the amount of crushing of the button 201 becomes large when the movement speed of the finger is equal to or higher than the predetermined speed. In such a way, the amount of crushing of the button 201 is changed in accordance with the movement speed of the finger in addition to such a change that the button 201 is crushed when the finger comes in contact with the display surface, thereby making it possible to give the variety to the input manipulation.

The user can recognize the input manipulation recognized by the information processor 100 because the display expression of the GUI is changed in accordance with the additional information. As a result, the operability is enhanced by feedback of the manipulation input made by the user himself/herself. In addition, the movement speed of the finger is changed in such a way that the processing corresponding to the input manipulation is executed, whereby it is possible to select the processing to be executed. Hereinafter, a description will be given with respect to a function and a configuration, and processing in the information processor 100 which can acquire information on the movement speed of the finger with respect to the display surface, can change the display expression of the GUI in accordance with the movement speed, and can select the processing to be executed.

2. Function and Configuration of Information Processor

Figure 4:
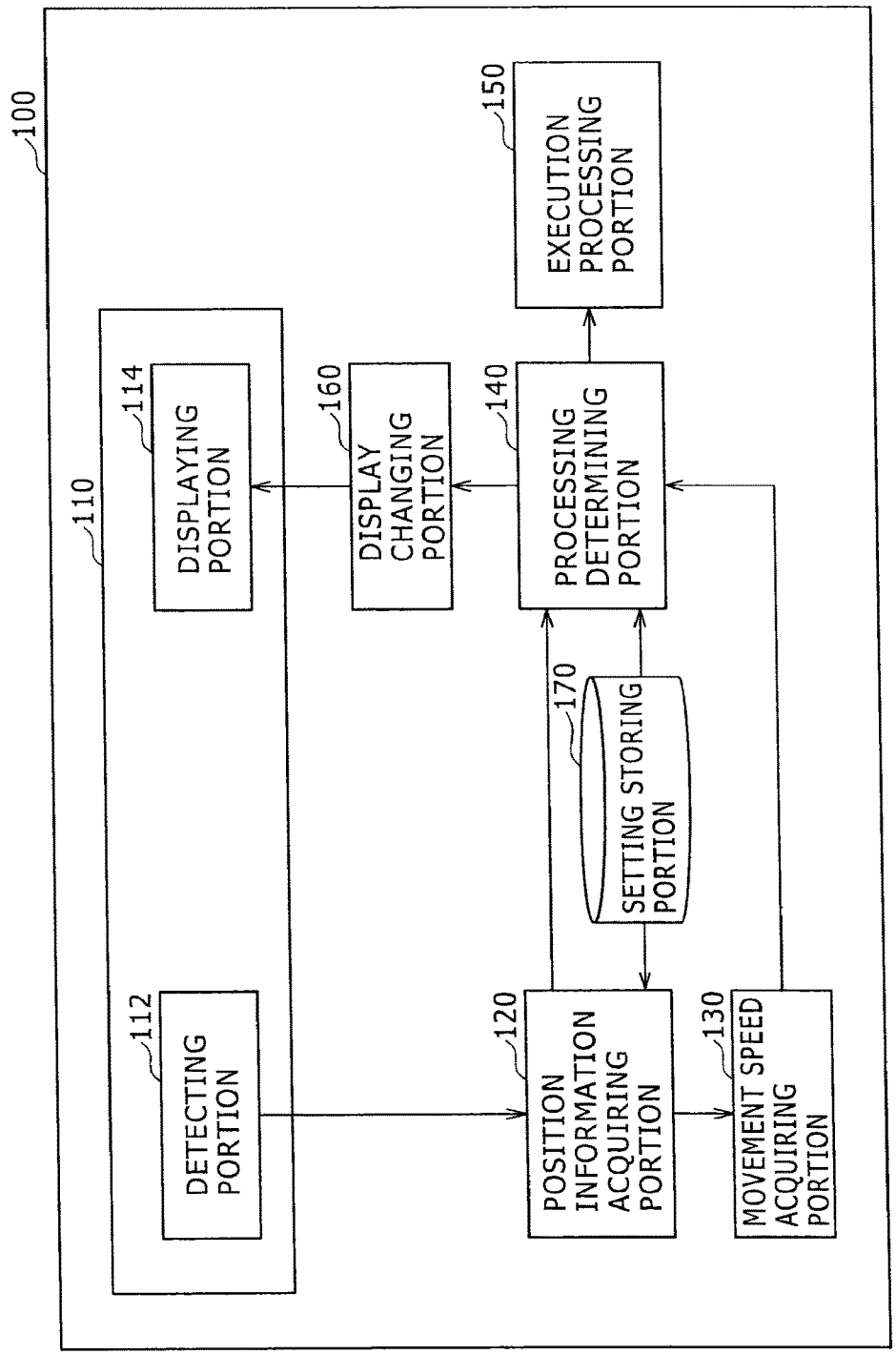
FIG. 4 is a block diagram showing a function and a configuration of the information processor of the first embodiment.
Figure 5:
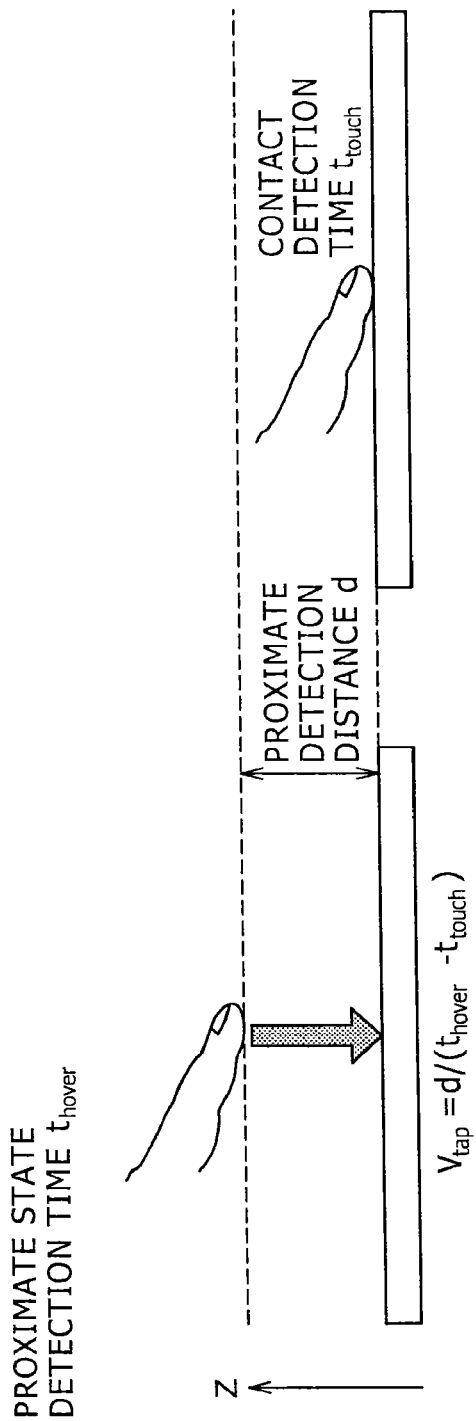
FIG. 5 is an explanatory view explaining processing for acquiring information on a movement speed of a finger in accordance with a proximate state of the finger, and a measurement time.
Figure 6:
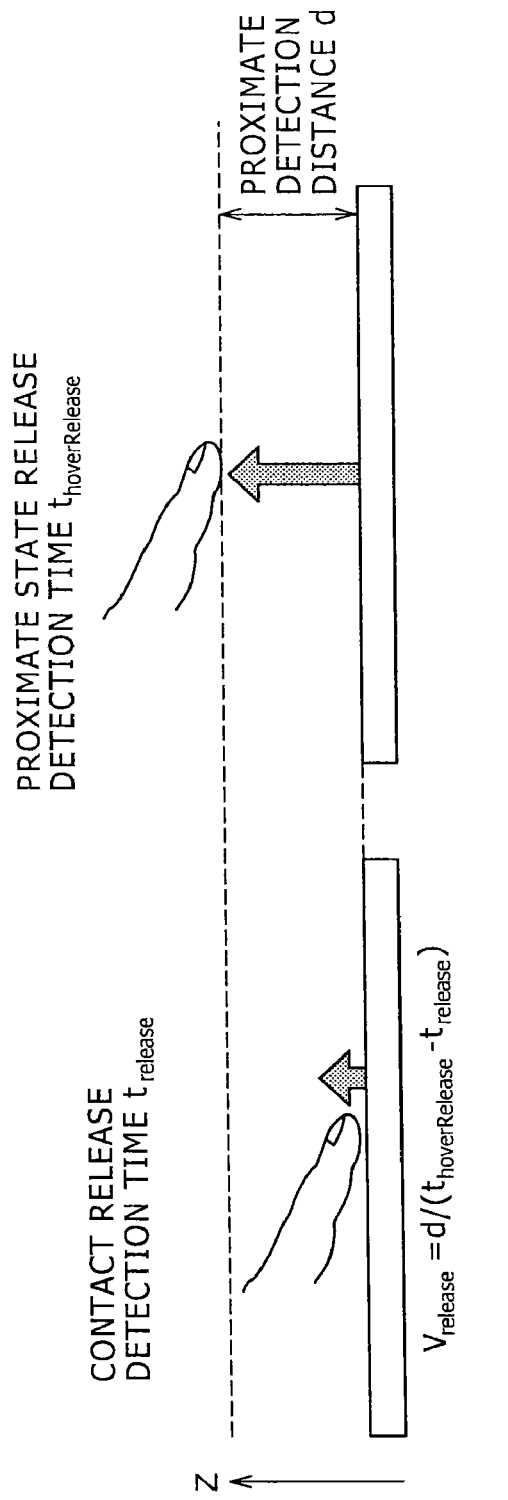
FIG. 6 is an explanatory view explaining processing for acquiring the information on the movement speed of the finger in accordance with the proximate state of the finger, and the measurement time.
Figure 7:
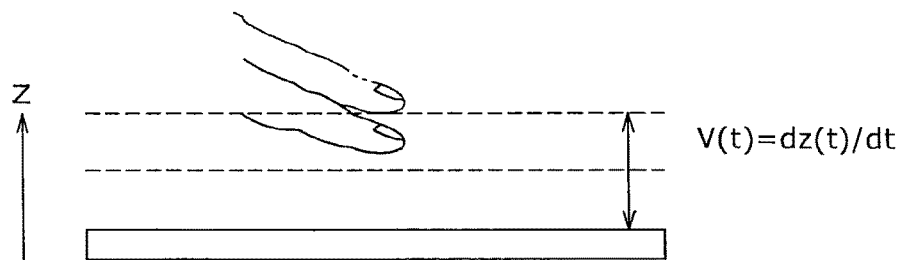
FIG. 7 is an explanatory view explaining processing for acquiring the information on the movement speed of the finger in accordance with a proximate distance between a display surface and the finger.
Figure 8:
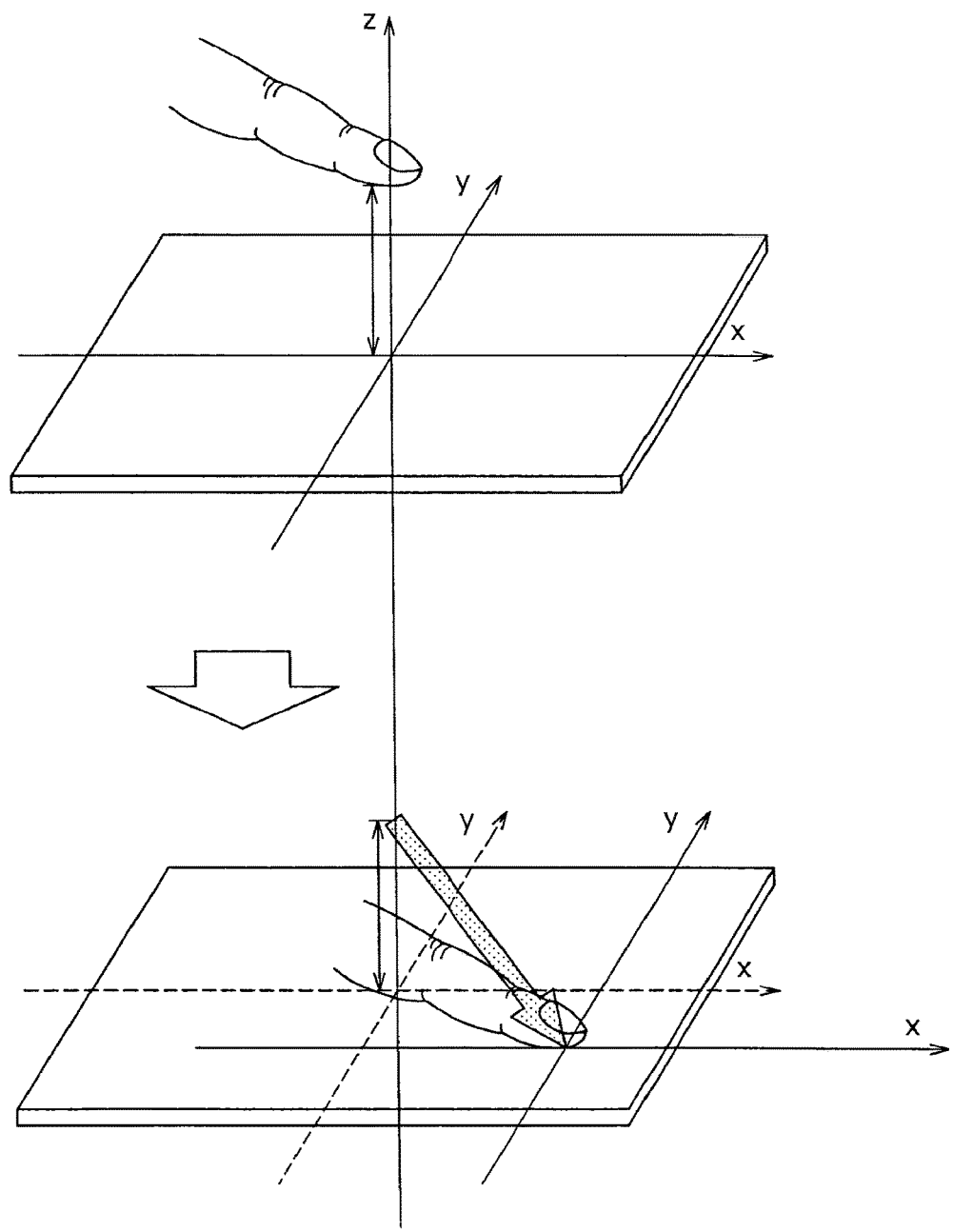
FIG. 8 is an explanatory view explaining processing for acquiring the information on the movement speed of the finger when the movement speed of the finger in a direction vertical to the display surface cannot be detected.
Figure 9:
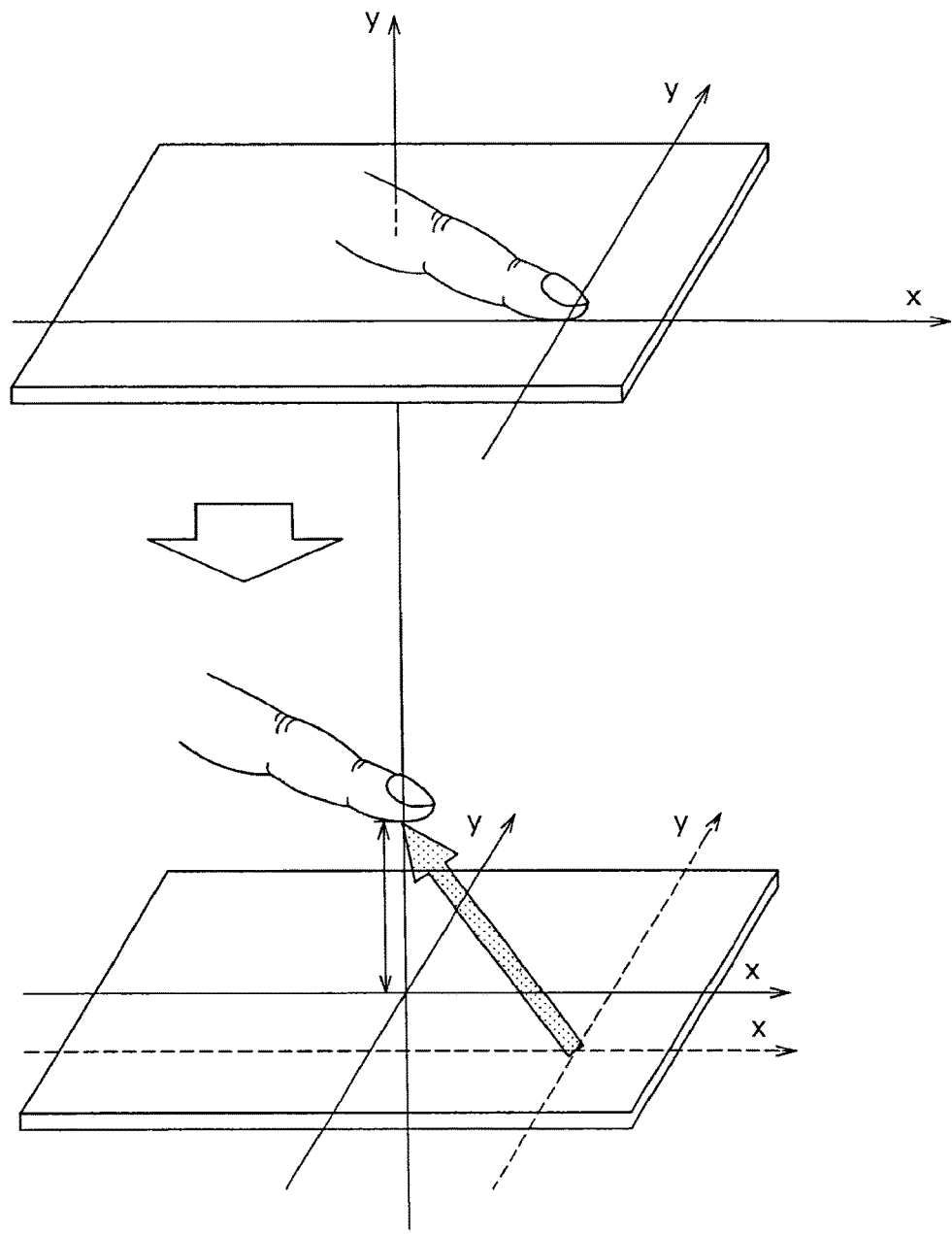
FIG. 9 is an explanatory view explaining the processing for acquiring the information on the movement speed of the finger when the movement speed of the finger in the direction vertical to the display surface cannot be detected.

Firstly, the function and configuration of the information processor 100 of the first embodiment will be described with reference to FIGS. 4 to 9. Note that, FIG. 4 is a block diagram showing the function and configuration of the information processor 100 of the first embodiment. FIGS. 5 and 6 are respectively explanatory views explaining processing for acquiring information on the movement speed of the finger in accordance with a proximate state of the finger, and a measurement time. FIG. 7 is an explanatory view explaining processing for acquiring the information on the movement speed of the finger in accordance with the proximate distance between the display surface and the finger. Also, FIGS. 8 and 9 are respectively explanatory views explaining processing for acquiring the information on the movement speed of the finger when the movement speed of the finger cannot be detected in a direction vertical to the display surface.

The information processor 100 of the first embodiment, as shown in FIG. 4, includes an input displaying portion 110, a position information acquiring portion 120, a movement speed acquiring portion 130, a processing determining portion 140, an execution processing portion 150, a display changing portion 160, and a setting storing portion 170.

The input displaying portion 110 is a functional portion for displaying thereon information, and inputting the information, and includes a detecting portion 112 and a displaying portion 114. The detecting portion 112 corresponds to the proximate touch sensor 105 shown in FIG. 1. An electrostatic touch panel or the like, for example, can be used as the detecting portion 112. In this case, the detecting portion 112 detects a value of an electrostatic capacitance which is changed in accordance with a proximate distance between the manipulation body and a display surface of the displaying portion 114.

When the manipulation body becomes close to the display surface of the displaying portion 114 by a predetermined distance or more, the value of the electrostatic capacitance detected by the detecting portion 112 is increased. As the manipulation body becomes closer to the display surface of the displaying portion 114, the value of the electrostatic capacitance thus detected is further increased. Also, when the manipulation body comes in contact with the display surface of the displaying portion 114, the value of the electrostatic capacitance detected by the detecting portion 112 gets a maximum value. The position information acquiring portion 120 which will be described later can acquire position information on the manipulation body with respect to the display surface of the displaying portion 114 in accordance with such a value of the electrostatic capacitance detected by the detecting portion 112. The detecting portion 112 outputs the value of the electrostatic capacitance thus detected as a detection result to the position information acquiring portion 120.

The displaying portion 114 is an output device, for displaying thereon information, which corresponds to the display device 104 shown in FIG. 1. A GUI object, a matter of contents associated with the GUI object, and the like, for example, are displayed on the displaying portion 114. In addition, when a display form of the object is changed to another one by the display changing portion 160, an object after completion of the change of the display form is displayed on the displaying portion 114 in accordance with display change information, on the object, of which the displaying portion 114 is informed from the display changing portion 160.

The position information acquiring portion 120 acquires position information representing a positional relationship between the manipulation body and the display surface of the displaying portion 114 in accordance with a detection result inputted thereto from the detecting portion 112. As described above, the manipulation body and the display surface of the displaying portion 114 are close to each other as the value of the electrostatic capacitance detected by the detecting portion 112 is larger. Thus, when the manipulation body comes in contact with the display surface of the displaying portion 114, the value of the electrostatic capacitance detected by the detecting portion 112 gets the maximum value. Information on a correspondence relationship between the value of the electrostatic capacitance, and the proximate distance (or a proximate detection area) is previously stored in the setting storing portion 170 which will be described later. The position information acquiring portion 120 acquires information on a position of the finger in a direction (in a z-axis direction) vertical to the display surface by referring to the setting storing portion 170 in accordance with the value of the electrostatic capacitance inputted thereto from the detecting portion 112.

In addition, the position information acquiring portion 120 specifies the position of the manipulation body on the display surface of the displaying portion 114 (that is, on an xy-plane) in accordance with the detection result inputted thereto from the detecting portion 112. For example, it is assumed that the detecting portion 112 is composed of an electrostatic sensor substrate in which electrostatically detecting grids for detecting an x-coordinate and a y-coordinate are formed. At this time, the detecting portion 112 can specify the position of the manipulation body on the electrostatic sensor substrate (that is, on the display surface) from a change in value of the electrostatic capacitance, in each of the grids, corresponding to the contact of the manipulation body. For example, the coordinate position whose value of the electrostatic capacitance is largest can be specified as the coordinates of the position where the finger comes to be closest to the display surface of the displaying portion 114. Or, the position of the center of gravity of the area in which the value of the electrostatic capacitance equal to or larger than a predetermined value is detected can be specified as the coordinates of the position where the finger comes to be closest to the display surface of the displaying portion 114.

In such a way, the position information acquiring portion 120 can acquire the position information on the manipulation body with respect to the display surface of the displaying portion 114. The position information on the manipulation body thus acquired is outputted from the position information acquiring portion 120 to each of the measurement speed acquiring portion 130 and the processing determining portion 140.

The movement speed acquiring portion 130 acquires movement speed information representing the movement speed of the finger with respect to the display surface of the displaying portion 114. A method of acquiring the movement speed information can be determined in accordance with acquirable information by the detecting portion 112. Here, the method of acquiring the movement speed information will be described with reference to FIGS. 5 to 9.

Acquisition of Movement Speed Information

Firstly, when the proximate distance between the display surface of the displaying portion 114, and the finger in the direction vertical to the display surface of the displaying portion 114 cannot be acquired in accordance with the detection result acquired from the detecting portion 112, the movement speed acquiring portion 130 measures a period of time until the finger for which a predetermined proximate state is detected comes in contact with the display surface, thereby making it possible to acquire the measurement speed of the finger. Here, it is assumed that the predetermined proximate state is obtained when the finger is located in a position which is located at a proximate detection distance, d, from the display surface. For example, when the finger is moved closer to the display surface, and a tapping operation is carried out with the finger, as shown in FIG. 5, a movement speed $V_{tap}$ of the finger can be acquired from Expression (1) by using a difference between a time (contact detection time $t_{touch}$) until the finger comes to contact the display surface and a time (proximate state detection time $t_{hover}$) at which the proximate state is detected, and the proximate detection distance d:

$$V_{tap}=d/(t_{hover}-t_{touch}) \quad (1)$$

Likewise, when an operation for causing the finger to get away from the display surface is carried out, as shown in FIG. 6, a movement speed $V_{release}$ of the finger can be acquired from Expression (2) by using a difference between a time (proximate state release detection time $t_{hoverRelease}$) at which the proximate state of the finger is released and a time (contact release detection time $t_{release}$) at which the contact state of the finger with respect to the display surface, and the proximate detection distance d:

$$V_{release}=d/(t_{hoverRelease}-t_{release}) \quad (2)$$

In addition, when the proximate distance between the display surface of the displaying portion 114, and the finger in the direction vertical to the display surface of the displaying portion 114 can be acquired in accordance with the detection result acquired from the detecting portion 112, as shown in FIG. 7, the movement speed acquiring portion 130 can acquire a movement speed V(t) of the finger by carrying out time differential calculus about a proximate distance Z(t). That is to say, the movement speed V(t) can be expressed by Expression (3):

$$V(t)=dZ(t)/dt \quad (3)$$

However, when the movement speed of the finger in the direction vertical to the display surface cannot be detected, a movement vector of the finger on the xy-plane may be acquired and a speed vector acquired by using the movement vector may be made the movement speed of the finger in the vertical direction. For example, as shown in FIG. 8, when the finger is moved closer to the display surface to carry out a tap manipulation, $V_x(t)$ as a time differential value of a movement distance x(t) in an x-direction, and $V_y(t)$ as a time differential value of a movement distance y(t) in a y-direction are both acquired. Also, the movement vector calculated from the movement vector of the finger on the xy-plane is acquired as VZ(t). In the case as well where an operation for causing the finger to get away from the display surface as shown in FIG. 9, likewise, the movement vector calculated from the movement vector of the finger on the xy-plane can be acquired as VZ(t).

It is noted that whether the finger comes in contact with the display surface or is caused to get away from the display surface can be determined in accordance with the magnitude of the electrostatic capacitance value detected by the detecting portion 112.

In such a way, the movement speed acquiring portion 130 acquires the movement speed information representing the movement speed of the finger with respect to the display surface of the displaying portion 114, and outputs the movement speed information thus acquired to the processing determining portion 140.

Referring back to FIG. 4, the processing determining portion 140 determines the display form of the object being displayed on the displaying portion 114, the execution of the processing (function) associated with the object, and the like in accordance with the position information and the movement speed information on the finger. The processing determining portion 140 specifies the object being displayed in the position corresponding to the position information of the finger, and determines the processing associated with the object, and the change of the display expression of the object in accordance with the movement speed information. In this case, the movement speed information is used as the additional information. Thus, the processing determining portion 140 can change the display expression in accordance with the movement speed of the finger, and can select the processing to be executed in accordance with the movement speed information. The processing determining portion 140 outputs the contents of the processing determined to at least one of the execution processing portion 150 or the display changing portion 160.

The execution processing portion 150 executes the processing associated with the object in accordance with the contents of the processing determined by the processing determining portion 140. The function corresponding to the manipulation input is carried out by the execution processing portion 150.

The display changing portion 160 changes the display information being displayed on the displaying portion 114 in accordance with the contents of the processing determined by the processing determining portion 140. The display changing portion 160, for example, generates an image for changing of the display shape of the object, or changing of the object being displayed, and outputs the information on the image to the displaying portion 114.

The setting storing portion 170 calculates the proximate distance between the manipulation body and the display surface, and generates the position information on the manipulation body on the display surface. In addition thereto, the setting storing portion 170 stores therein information which is used during the processing for changing the display form of the object as setting information. The setting storing portion 170, for example, stores therein information on a correspondence relationship between the values of the electrostatic capacitances, and the proximate distances. The position information acquiring portion 120 can acquire the information on the position corresponding to the value of the electrostatic capacitance inputted thereto from the detecting portion 112 by referring to such a correspondence relationship. In addition, the contents of the processing corresponding to the manipulation input which is carried out for the object by the user are stored in the setting storing portion 170. The setting information stored in the setting storing portion 170 either may be previously stored, or may be set by the user.

It is noted that the information processor 100 of the first embodiment may include a memory and the like for temporarily storing therein information necessary for the processing for changing the display form of the object and the like.

3. Object Manipulation Controlling Processing Using Movement Speed Information

The information processor 100 of the first embodiment can acquire both the information on the position of the finger with respect to the display surface, and the information on the movement speed of the finger with respect to the display surface because it includes the function described above. The information processor 100 controls the information on the object manipulation being displayed on the displaying portion 114 by using these pieces of information, thereby making it possible to give the variety to the manipulation input to the information processor 100. Hereinafter, object manipulation controlling processing, in an information processing method according to a second embodiment of the present disclosure, which is executed by the information processor 100 of the first embodiment will be described with reference to FIG. 10. Here, FIG. 10 is a flow chart explaining the object manipulation controlling processing, in the information processing method according to the second embodiment of the present disclosure, which is executed by the information processor 100 of the first embodiment.

When the finger either is moved closer to or comes in contact with the display surface of the displaying portion 114 and thus a change in electrostatic capacitance value is detected by the detecting portion 112, the position information acquiring portion 120 of the information processor 100 acquires the information on the position of the finger with respect to the display surface (S100). For example, when the detecting portion 112 is composed of the electrostatic sensor substrate on which the electrostatically detecting grids for detecting the x-coordinate and the y-coordinate are formed, as described above, the position information acquiring portion 120 may determine either the coordinate position having the largest electrostatic capacitance value, or the position of the center of gravity of the area in which the electrostatic capacitance value equal to or larger than the predetermined value is detected as the coordinates, on the xy-plane, of the position where the finger is closest to the display surface.

In addition, the position information acquiring portion 120 acquires the information as well on the position in the direction (in the z-direction) vertical to the display surface. The information on the position of the finger in the z-direction differs depending on the information which can be detected by the detecting portion 112. For example, when the proximate distance from the display surface to the finger can be acquired by the detecting portion 112, the proximate distance gives the position information in the z-direction. In addition, when the detecting portion 112 can detect that the finger is located within an area (proximate detection area) between the display surface and the position located at the proximate detection distance, d, from the display surface, the position information in the z-direction becomes information as to whether or not the finger exists in the proximate detection area, and whether or not the finger contacts the display surface.

Figure 10:
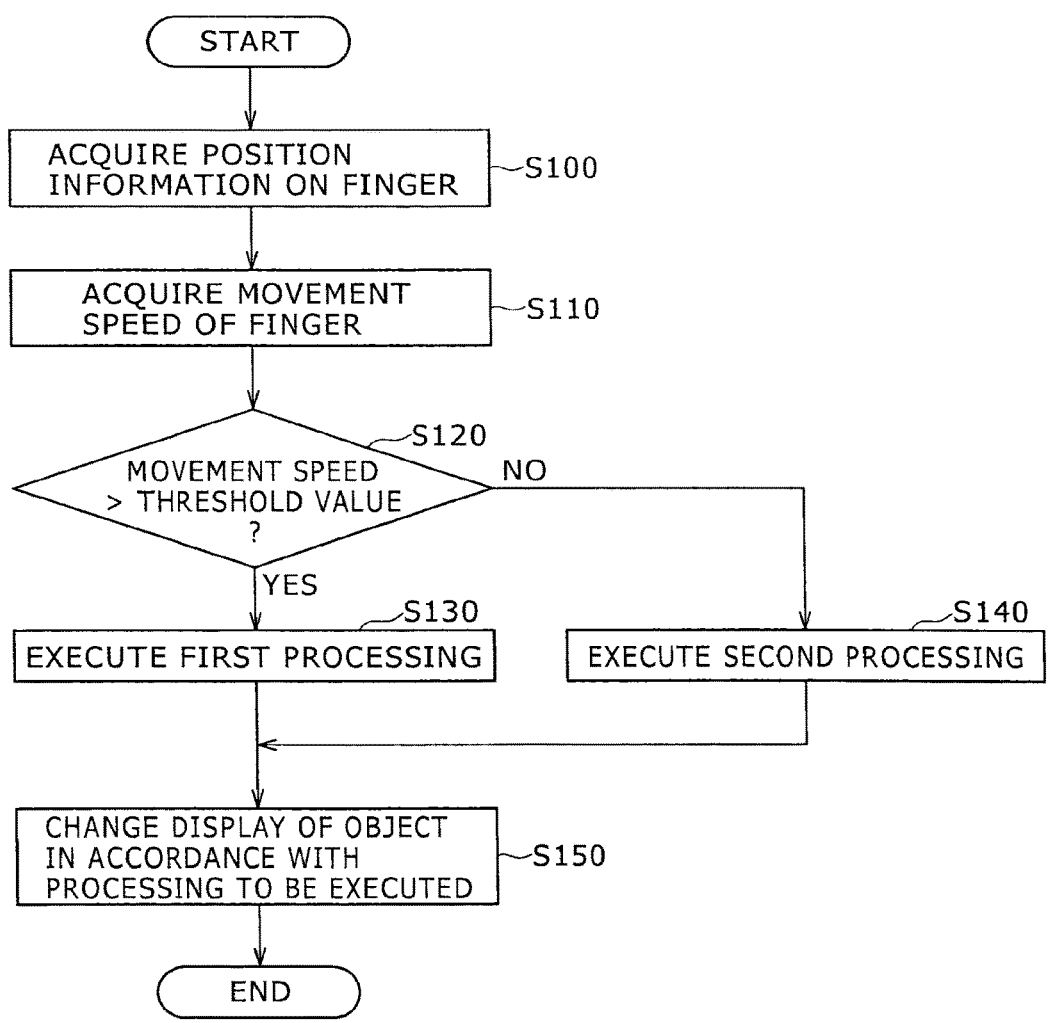
FIG. 10 is a flow chart explaining object manipulation controlling processing, in an information processing method according to a second embodiment of the present disclosure, which is executed by the information processor of the first embodiment.

It is noted that even when the information on the position of the finger in the z-direction cannot be acquired by the detecting portion 112, it is possible to execute the object manipulation controlling processing shown in FIG. 10. Therefore, in Step S100, it is only necessary to be capable of acquiring at least the position of the finger on the xy-plane. The position information acquiring portion 120 outputs the position information thus acquired to each of the movement speed acquiring portion 130 and the processing determining portion 140.

Next, the movement speed acquiring portion 130 acquires the movement speed information representing the movement speed of the finger in accordance with the position information inputted thereto from the position information acquiring portion 120 (S110). Here, the movement speed information has only to contain at least the information on the measurement speed in the vertical direction to the display surface, that is, in the z-direction. Also, the measurement speeds of the finger in the x-direction and in the y-direction have to be acquired only when they become necessary for the determination processing executed by the processing determining portion 140. The movement speed of the finger in the z-direction can be acquired by using the position information acquired in Step S100 In this case, as described above, the movement speed acquiring portion 130 suitably carries out the method by using which the movement speed in the z-direction can be acquired in accordance with the information contained in the position information, thereby acquiring the movement speed information. The movement speed acquiring portion 130 outputs the movement speed information thus acquired to the processing determining portion 140.

In addition, the processing determining portion 140 determines the processing which is to be executed by the manipulation input made by the user in accordance with both position information and the movement speed information on the finger (S120). In Step S120, in addition to the information on the basic motions, of the finger, such as the tapping operation and the scroll motion, the information on the movement speed of the finger is utilized as the additional information, thereby determining the contents of the processing which is to be executed by the manipulation input made by the user (S130, S140).

For example, as shown in FIG. 3, when the GUI of the button 201 is displayed on the displaying portion 114, and the user contacts the position where the button 201 is displayed with his/her finger, the display expression of the button 201 is changed to the display expression in which the button 201 is crushed. At this time, the processing determining portion 140 determines whether or not the movement speed of the finger is higher (larger) than a predetermined speed (threshold value) by referring to the setting storing portion 170 (S120). Also, when it is determined in Step S120 that the movement speed of the finger is higher than the predetermined speed (YES), the processing determining portion 140 compares this case with the case where the movement speed of the finger is equal to or lower than the predetermined speed, thereby increasing the amount of crushing of the button 201 (S130: first processing). On the other hand, when it is determined in Step S120 that the movement speed of the finger is equal to or lower than the predetermined speed (NO), the display expression is changed in such a way that the button 201 is crushed by an amount of reference crushing of the button 201 previously set (S140: second processing).

In such a way, the processing determining portion 140 can determine an amount of crushing of the button 201 in accordance with the movement speed of the finger, and can change the display expression of the GUI in accordance with the movement speed of the finger. The processing determining portion 140 outputs the contents of the processing thus determined to at least one of the execution processing portion 150 or the display changing portion 160 (S150) Since in the case of FIG. 3, the display expression of the button 201 is changed to another one in accordance with the movement speed of the finger, the contents of the processing are outputted to at least the display changing portion 160. The display changing portion 160 changes the GUI in such a way that the button 201 is crushed by an amount of crushing of the button 201 determined in the processing determining portion 140, and outputs information on the GUI thus changed to the displaying portion 114. In such a way, the user can visually recognize the manipulation input depending on the difference in movement speed of the finger.

It is noted that when the button 201 is associated with the different pieces of processing in correspondence to the difference in movement speed of the finger, the contents of the processing determined by the processing determining portion 140 are outputted to the execution processing portion 150. The execution processing portion 150 executes the processing with which the button 201 is associated in accordance with the processing contents. As a result, the user can also select the processing to be executed by changing the movement speed of the finger.

The description has been given so far with respect to the object manipulation controlling processing, using the movement speed information in the information processing method of the second embodiment, which is executed by the information processor 100 of the first embodiment. According to the second embodiment of the present disclosure, when it is detected that the user carries out the operation for tapping the display surface with his/her finger in accordance with the detection result acquired from the detecting portion 112, the processing determining portion 140 determines the contents of the processing to be executed in accordance with the movement speed of the finger when the tapping operation is carried out. As a result, it is possible to give the variety to the input manipulation in the touch panel.

4. Variation

The object manipulation controlling processing, in the information processing method of the second embodiment, which is executed by the information processor 100 of the first embodiment can also be applied to cases other than the case of the changing of the display expression of the GUI as shown in FIG. 3. Hereinafter, examples of application of the object manipulation controlling processing, in the information processing method of the second embodiment, which is executed by the information processor 100 of the first embodiment will be described in order. It is noted that in the following description, the movement speed of the finger means the movement speed of the finger in the vertical direction (that is, in the z-direction) to the display surface of the displaying portion 114 except for the case where the special mention is made.

Expression Change of GUI: Display Sinking in Back Direction

Figure 11:
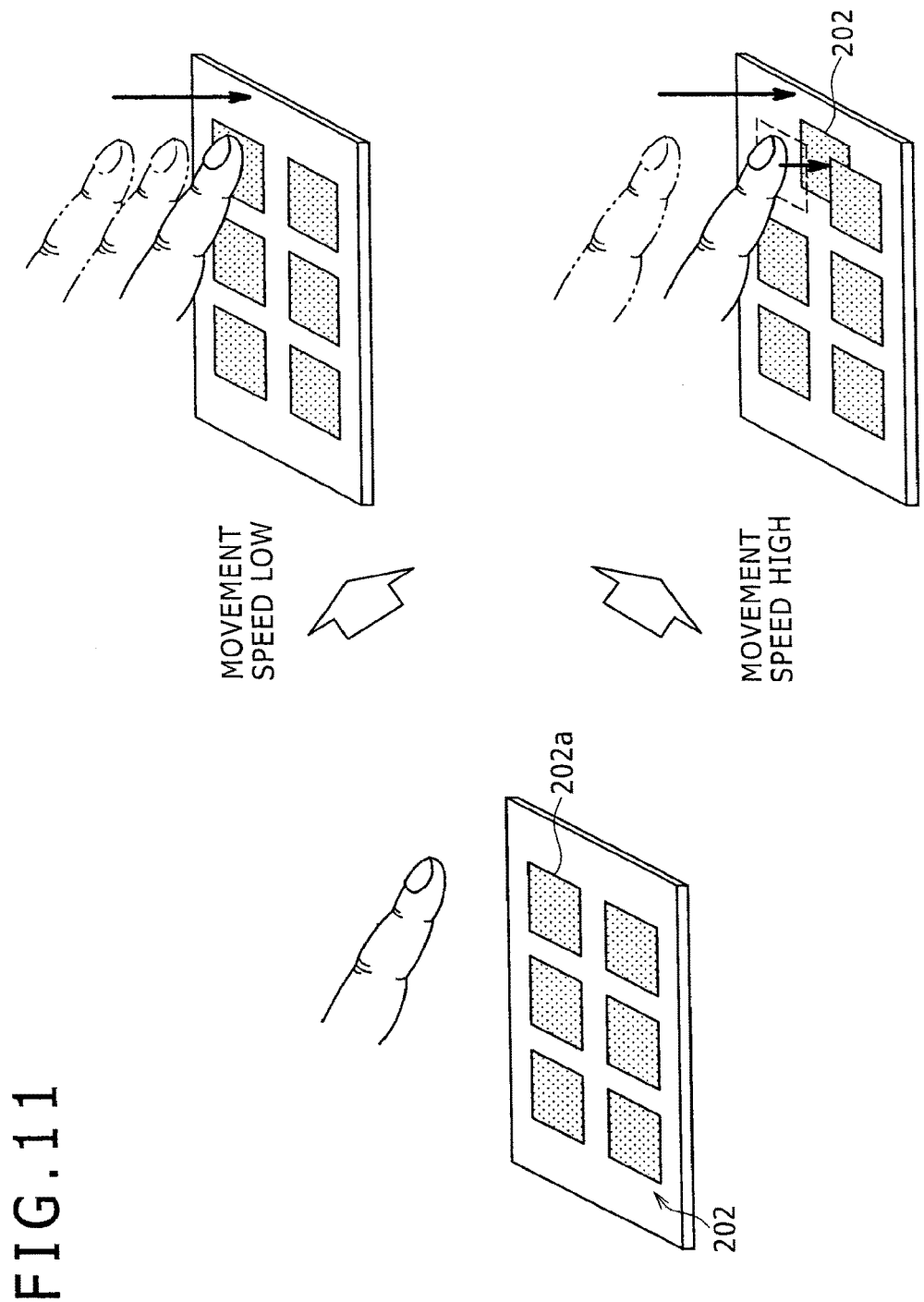
FIG. 11 is an explanatory view explaining a display expression changing manipulation for moving an object in the back direction of a picture as an example of a change of the display expression of a GUI when a tapping operation is carried out.

FIG. 11 is an explanatory view explaining the display expression changing processing for moving the object in the back direction of a picture as an example of the change of the display expression of the GUI when the tapping operation is carried out. In this case, when the movement speed of the finger with which the tapping operation is carried out for the display surface is higher than the predetermined speed, the object can be moved in the back direction of the picture. As shown in FIG. 11, it is assumed that an object group 202 composed of plural objects is displayed on the displaying portion 114. In a state of not receiving the manipulation input, the plural objects in the object group 202 are disposed on the same surface parallel with the display surface of the displaying portion 114.

It is assumed that the tapping operation is carried out, for example, for the object 202a of the plural objects in the object group 202. The processing determining portion 140 detects that a manipulation is desired to be carried out for the object 202a in accordance with the position information acquired from the position information acquiring portion 120. Also, the processing determining portion 140 acquires the information on the movement speed of the finger with which the tapping operation is carried out from the movement speed acquiring portion 130 by utilizing the information processing method of the second embodiment described above. When it is determined that the movement speed of the finger is equal to or lower than the predetermined speed, the display expression of the object 202a is not changed. On the other hand, when it is determined that the movement speed of the finger is higher than the predetermined speed, the processing determining portion 140 determines that the display expression is changed in such a way that the object 202a which the finger is desired to contact is processed to sink in the back of the picture by the finger movement force. The information on the processing contents to be changed is assumed to be stored in the setting storing portion 170.

The processing determining portion 140 outputs the processing contents determined to the display changing portion 160. The display changing portion 160 changes the display information in such a way that the object 202a being displayed on the displaying portion 114 sinks in the back of the picture in accordance with the processing contents. Also, the display changing portion 160 causes the displaying portion 114 to display thereon the display information after completion of the changing of the display information. In such a way, as shown in FIG. 11, the display expression of the object 202a is changed. In such a way, the display expression of the object is changed in accordance with the movement speed of the finger with which the tapping operation is carried out, whereby the user can visually recognize what kind of manipulation input has been carried out. In addition, when the object is associated with the predetermined processing, the processing to be executed can also be changed in accordance with the movement speed of the finger with which the object is desired to be selected. As a result, the processing to be executed can be selected in accordance with the movement speed of the finger with which the tapping operation is carried out.

Execution of Processing Corresponding to Movement Speed of Finger (Function Performance Confirmation)

Figure 12:
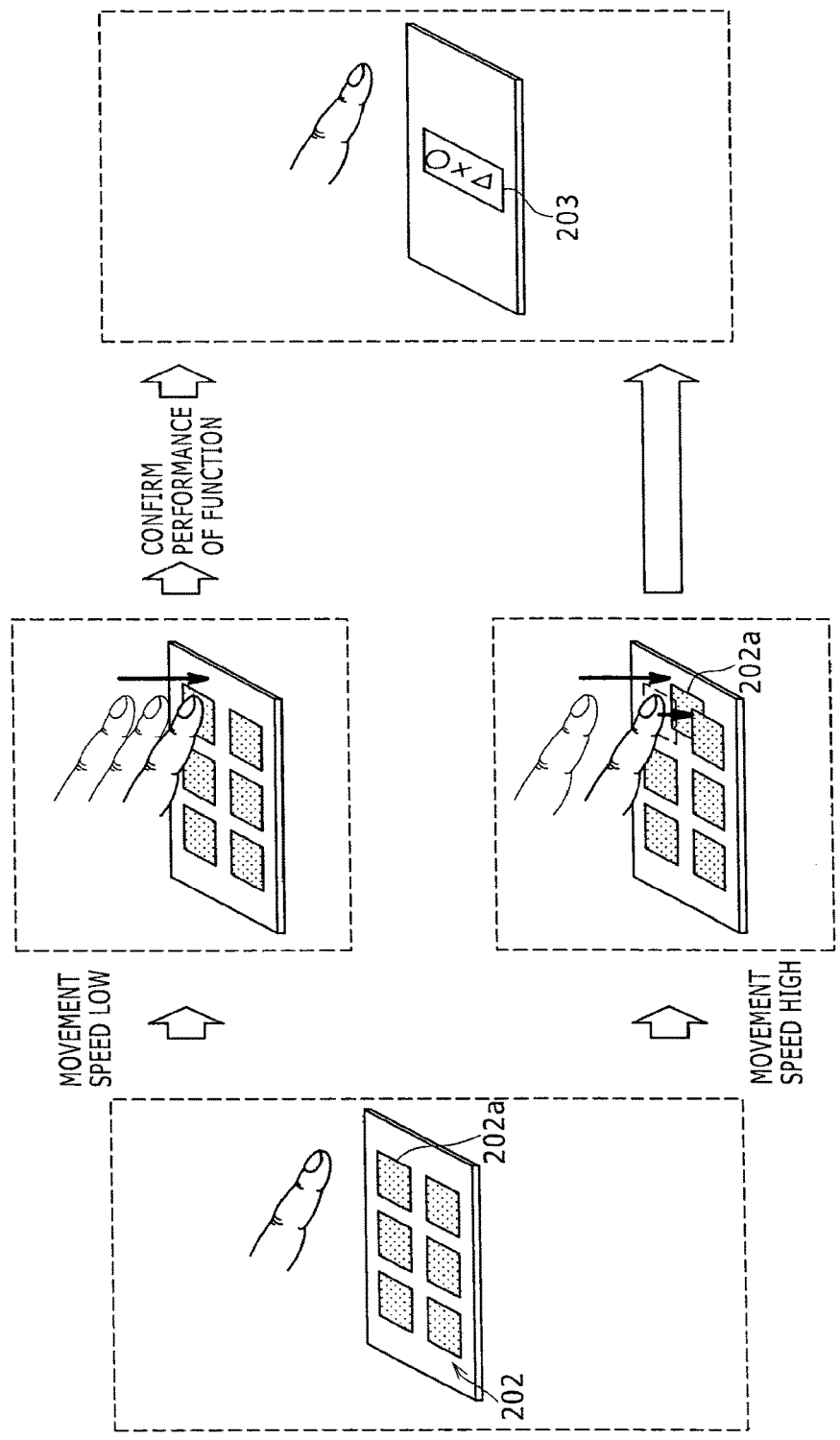
FIG. 12 is an explanatory view explaining an example in which when the same object is selected in the case where objects are associated with predetermined functions, respectively, a process for carrying out a function with which the object is associated is changed in accordance with the movement speed of the finger.

When the same object is selected in the case where the object is associated with a predetermined function, a process for carrying out the function associated with the object concerned can also be changed in accordance with the movement speed of the finger. In an example shown in FIG. 12, the function associated with the object concerned is carried out by tapping a desired object with the finger. For example, the object 202a in the object 202 is tapped with the finger, an object 203 is displayed on the displaying portion 114.

When the processing determining portion 140 detects that the object 202a has been tapped with the finger in accordance with the position information acquired by the position information acquiring portion 120, the processing determining portion 140 determines whether or not the movement speed of the finger the information on which is acquired by the movement speed acquiring portion 130 is higher than the predetermined speed. Also, when it is determined that the movement speed of the finger is equal to or lower than the predetermined speed, the processing determining portion 140 does not cause the displaying portion 114 to change the display expression of the object 202a, but confirms right or wrong as to carrying-out of the function associated with the object 202a. The right or wrong as to carrying-out of the function, for example, can be carried out in the form of pop-up display, a sound or the like. Also, when the user permits the function to be carried out, the function is carried out, and the object 203 is displayed on the displaying portion 114.

On the other hand, when it is determined that the movement speed of the finger is higher than the predetermined speed, the processing determining portion 140 causes the display changing portion 160 to change the display expression of the object 202a in such a way that the object 202a sinks in the back of the picture. Also, the processing determining portion 140 carries out directly the function associated with the object 202a and causes the displaying portion 114 to display thereon the object 203 by using the display changing portion 160 without confirming whether the carrying-out of the function is right or wrong from the user.

In such a way, the process for carrying out the function associated with the object can be determined in accordance with the movement speed of the finger with which the object is desired to be selected. For example, when the function is desired to be directly carried out without displaying a message for confirming whether the carrying-out of the function is right or wrong from the user, it is only necessary for the user to quickly move his/her finger to carry out the tapping operation.

Execution of Processing Corresponding to Movement Speed of Finger (Utilization of Display Area Other than Object)

In the case where the object is associated with the predetermined function, normally, even when the user touches the display area other than the object with his/her finger, no reaction occurs at all. With the information processor 100 of the first embodiment, when it is detected that the tapping operation is carried out in the display area other than the object at the speed higher than the predetermined speed by utilizing the function capable of acquiring the information on the movement speed of the finger, it is also possible to change a layer picture from the layer picture which is currently displayed on the displaying portion 114 to a next layer picture.

Figure 13:
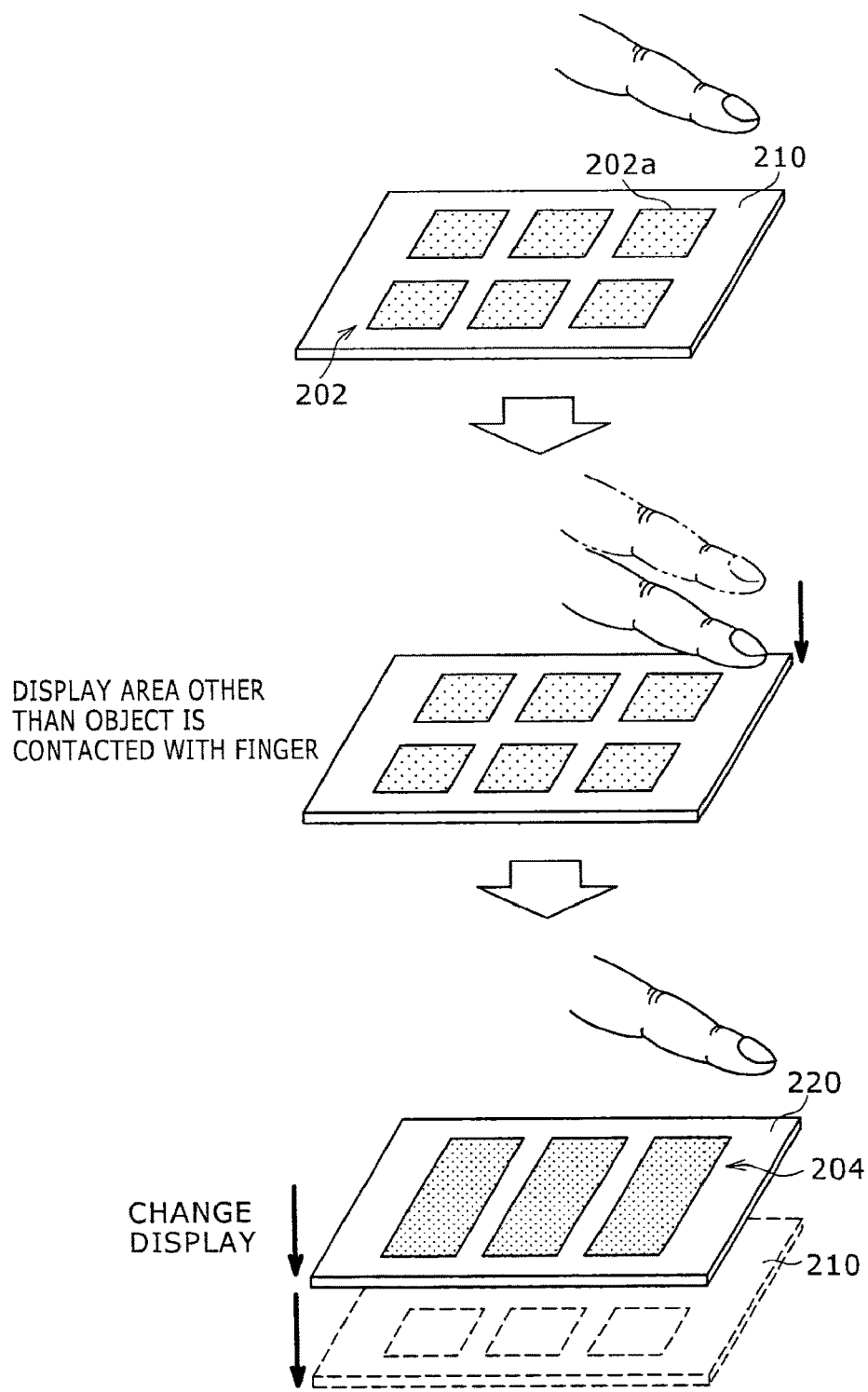
FIG. 13 is an explanatory view explaining an example in which processing corresponding to the movement speed of the finger and utilizing a display area other than the object is executed.

For example, as shown in FIG. 13, it is assumed that the object group 202 composed of the object 202a, etc. is displayed on a first layer picture 210. The objects are associated with the predetermined functions, respectively, and the desired object is tapped with the finger, thereby making it possible to carry out the function with which the desired object is associated. On the other hand, even when the tapping operation is carried out in the display area other than the object at the speed equal to or lower than the predetermined speed, some sort of function is not carried out, and also the display contents of the displaying portion 114 are not changed at all.

However, when the tapping operation is carried out in the display area other than the object at the speed higher than the predetermined speed, for example, as shown in FIG. 13, the layer picture is changed from the first layer picture 210 in which the object group 202 has been displayed to a second layer picture in which an object group 204 is displayed.

Referring to FIG. 13, the layer picture is changed in such a way that the first layer picture 210 is moved so as to lightly fall in the back of the picture, thereby displaying the second layer picture 220.

In such a way, when the movement speed of the finger with which the display area is tapped is higher than the predetermined speed, the function of carrying out the layer picture changing manipulation is carried out by utilizing the display area other than the object. The user can intuitively carry out the layer picture changing manipulation. In addition, the layer picture changing function is carried out exclusively only in the case where the movement speed of the finger is higher than the predetermined speed. Therefore, even if the display area other than the object is tapped with the finger by mistake when the object is desired to be tapped with the finger, in the case where the movement speed of the finger is equal to or lower than the predetermined speed, the layer picture changing function is not carried out, and thus the malfunction can be prevented from being caused.

Figure 14:
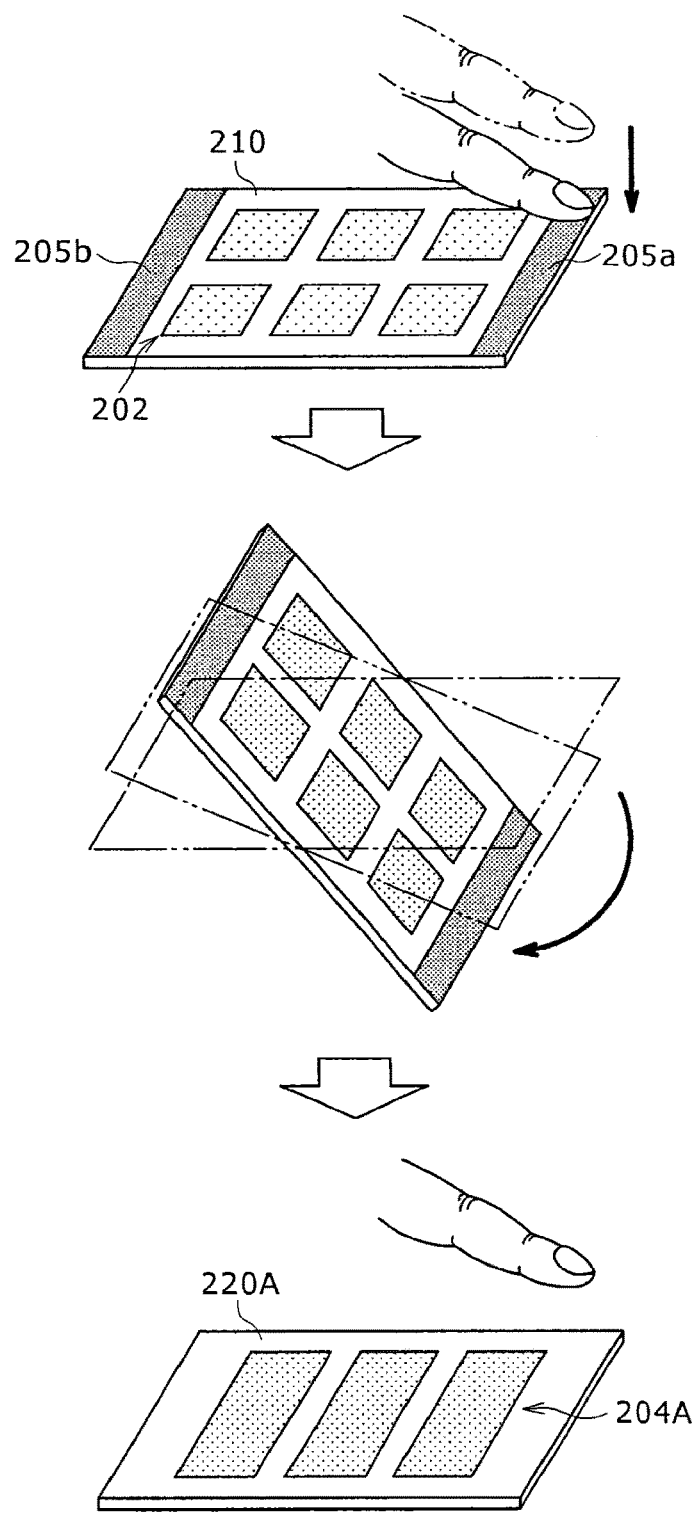
FIG. 14 is an explanatory view explaining another example in which a layer picture is changed to another one by utilizing a display area other than the object.
Figure 15:
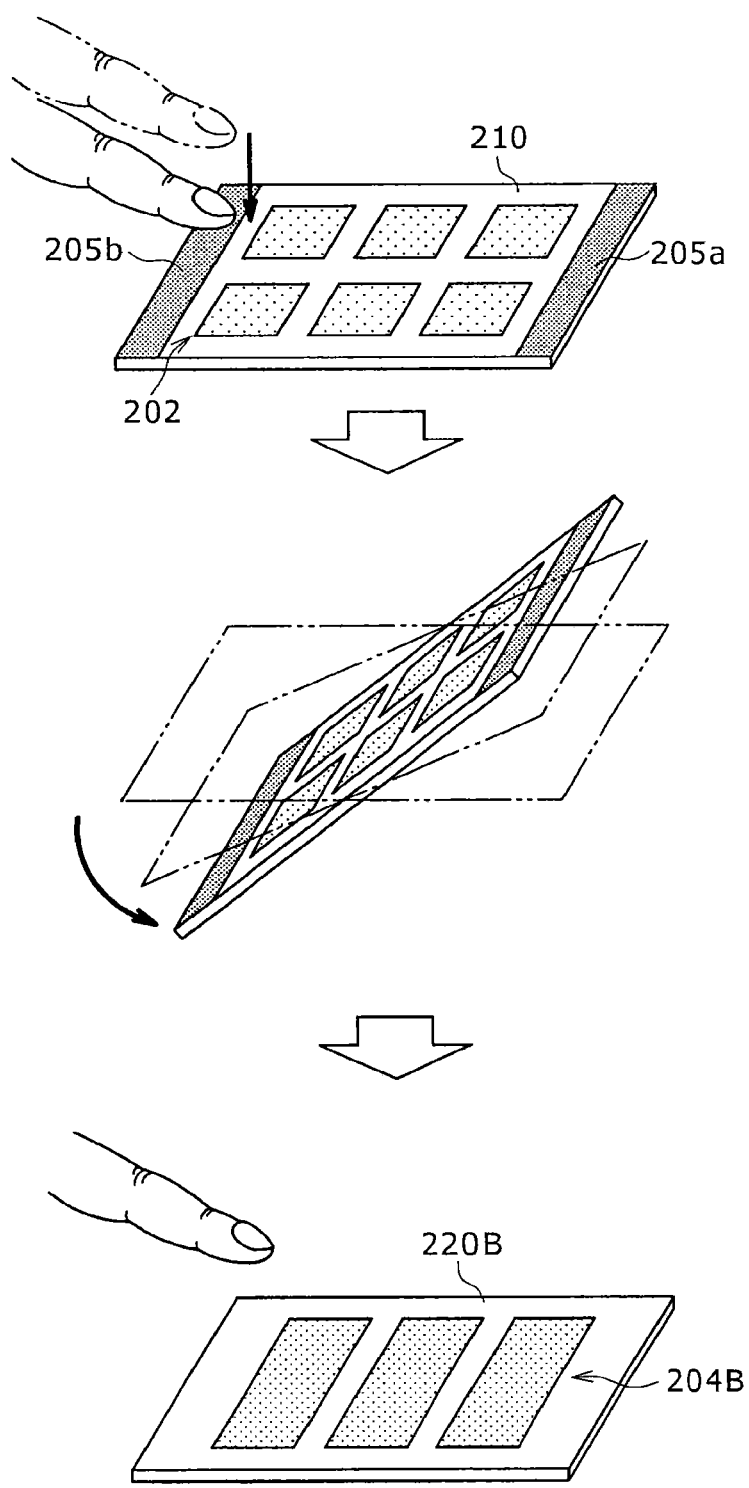
FIG. 15 is an explanatory view explaining still another example in which the layer picture is changed to another one by utilizing the display area other than the object.

FIGS. 14 and 15 show other examples in each of which the layer picture is changed to another one by utilizing the display area other than the object. In each of the examples shown in FIGS. 14 and 15, respectively, when the display area other than the object is tapped with the finger, the layer picture 210 is rotated. In this case, the layer picture is changed in such a way that when the layer picture 210 is rotated by 180°, the second layer picture 220 is displayed.

For example, as shown in FIG. 14, input areas 205a and 205b in each of which the manipulation input for carrying out the layer picture changing is received are set in the display area other than the object. The input areas 205a and 205b, for example, can be provided in both ends of the display area, respectively. When the user moves his/her finger at the movement speed higher than the predetermined speed to carry out the tapping operation for the input area 205a, the layer picture 210 is rotated in a clockwise direction in such a way that the layer picture 210 is rotated by a depressing force of the finger. Also, the layer picture is changed in such a way that when the first layer picture 210 is rotated by 180°, for example, the second layer picture 220A is displayed in which the object 204A is being displayed.

In addition, as shown in FIG. 15, when the user moves his/her finger at the movement speed higher than the predetermined speed to carry out the tapping operation for the input area 205b, the layer picture 210 is rotated in a counterclockwise direction in such a way that the layer picture 210 is rotated by the depressing force of the finger. Also, the layer picture is changed in such a way that when the first layer picture 210 is rotated by 180°, the second layer picture 220B is displayed in which the object 204B is being displayed.

In such a way, the layer picture is changed in such a way that the layer picture is rotated in which the object is being displayed, whereby the user can intuitively carry out the layer picture changing manipulation, and can receive the change in picture without feeling an unpleasant sensation. It is noted that even when the tapping operation is carried out in an area, other than the input areas 205a and 205b, of the display area other than the object, some sort of function is not carried out, and the display contents of the displaying portion 114 is not changed at all. Likewise, even when the tapping operation is carried out in such an area at the movement speed equal to or lower than the predetermined speed, some sort of function is not carried out, and the display contents of the displaying portion 114 is not changed at all. As a result, the malfunction can be prevented from being caused.

Execution of Processing Corresponding to Movement Speed of Finger (Carrying-Out of Different Functions)

Figure 16:
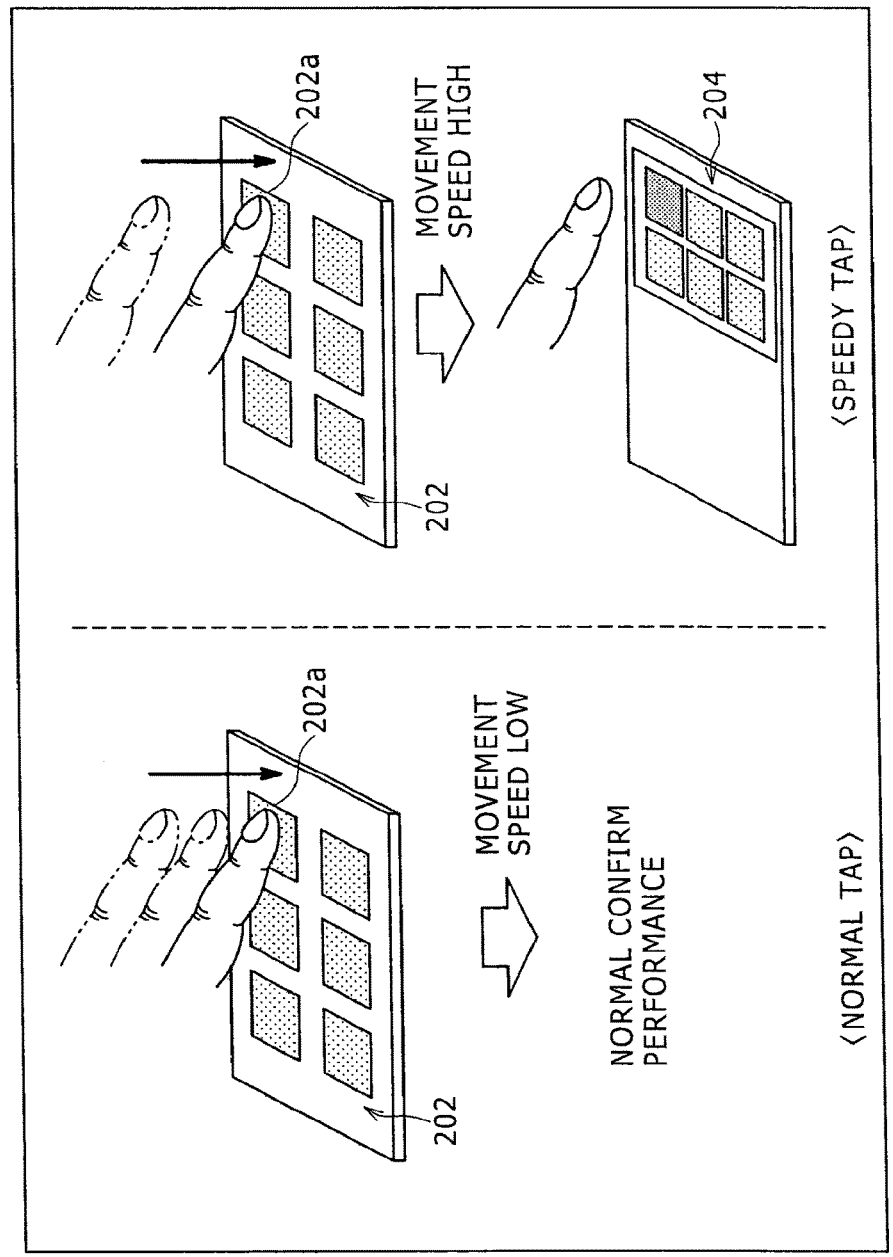
FIG. 16 is an explanatory view explaining an example in which when the same object is selected in the case where the objects are associated with the predetermined functions, respectively, the different functions are carried out in accordance with the movement speed of the finger.

With the information processor 100 of the first embodiment, when the same object is selected in the case where the objects are associated with the predetermined functions, respectively, different functions can also be carried out in accordance with the movement speed of the finger. For example, as shown in FIG. 16, it is assumed that the object group 202 composed of the plural objects is displayed on the displaying portion 114. The desired object is tapped with the finger, whereby the function associated with the desired object is carried out. At this time, one object is associated with plural functions which are carried out in accordance with the movement speeds of the finger, respectively, with which the object concerned is tapped.

For example, as shown in FIG. 16, when the object 202a is tapped with the finger at the movement speed equal to or lower than the predetermined speed (normal tap), the processing determining portion 140 causes a normal function associated with the object 202a to be carried out. On the other hand, when the object 202a is tapped with the finger at the movement speed higher than the predetermined speed (speedily tap), the processing determining portion 140 causes the object group 204 to be developed into a list so as to display all of the objects which are contained in the object 202a concerned. In such a way, the movement speed of the finger with which the same object is tapped is changed, whereby the different manipulations can be allocated, and thus the operability can be enhanced.

For example, when the contents such as photographs and images are grouped depending on a date and a content, the object group 202 having typical contents of the groups as the objects is shown. Also, when the normal tap is carried out for any one of the objects composing the object group 202 at the movement speed equal to or lower than the predetermined speed, the typical contents are selected. On the other hand, when the tapping operation is carried out for any one of the objects composing the object group 202 at the movement speed higher than the predetermined speed, an object group 204 composed of the contents belonging to the same group as that of the typical contents is displayed in the form of a list. In such a way, when the objects are hierarchized, the movement speed of the finger with which the object is tapped is changed, whereby the hierarchy to be displayed can be changed, and the desired contents can also be carried out.

Contact Position Correcting Processing

Figure 17:
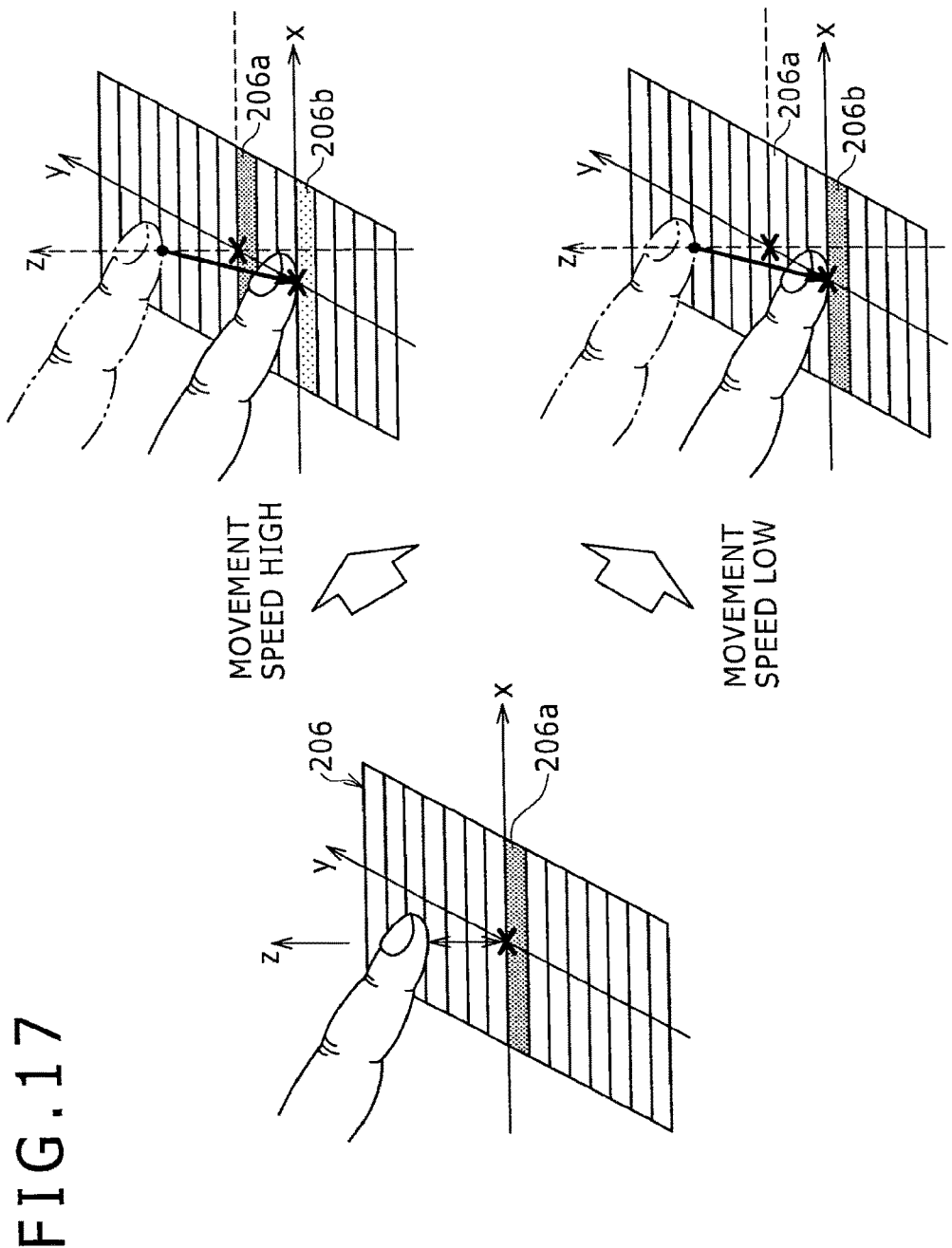
FIG. 17 is an explanatory view explaining contact position correcting processing executed in the information processor of the first embodiment.
Figure 18:
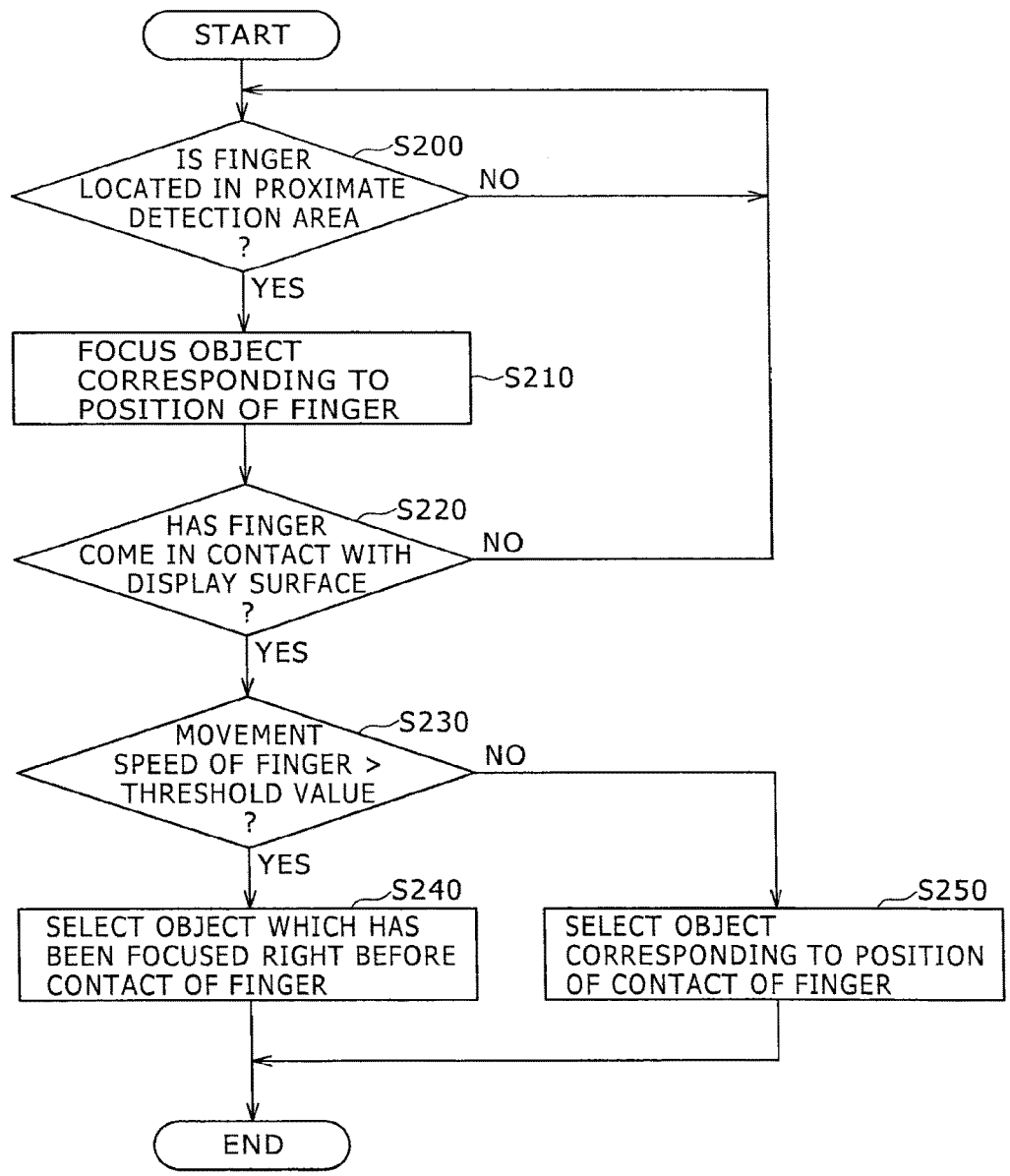
FIG. 18 is a flow chart explaining the contact position correcting processing executed in the information processor of the first embodiment.

As described above, the information processor 100 of the first embodiment changes the display expression of the GUI, and the processing to be executed in accordance with the movement speed of the finger with which the object is tapped. At this time, when the movement speed of the finger is too high, the possibility that the object which the user does not intend to tap the display surface with his/her finger is determined to be tapped becomes large, and thus it is feared to cause the malfunction. In order to cope with such a situation, with the information processor 100 of the first embodiment, the position where the finger contacts the object can also be corrected in accordance with the movement speed of the finger. Hereinafter, the contact position correcting processing executed in accordance with the movement speed of the finger will be described with reference to FIGS. 17 and 18. Here, FIG. 17 is an explanatory view explaining the contact position correcting processing executed in the image processor 100 of the first embodiment. Also, FIG. 18 is a flow chart explaining the contact position correcting processing executed in the image processor 100 of the first embodiment.

As shown in FIG. 17, it is assumed that an object 206 which is divided into plural areas is displayed on the displaying portion 114. The user moves his/her finger closer to the object 206, whereby it is possible to focusing an area corresponding to the position to which his/her finger is moved closer. In FIG. 17, an area 206*a* of the object 206 is focused. When from such a state, the user moves his/her finger onto the display surface of the displaying portion 114 to cause his/her finger to come in contact with a part of the object 206, the area of the object 206 selected is corrected in accordance with the movement speed of the finger.

When the movement speed of the finger is higher than the predetermined speed, the precision of the manipulation for selection using the finger is reduced, a position different from the desired position is easy to select. Then, with the information processor 100 of the first embodiment, it is assumed that when the movement speed of the finger with which the tapping operation is carried out is equal to or lower than the predetermined speed, the focused area located in the position which the finger contacts is selected. In FIG. 17, an area 206*b* which the finger contacts is selected. On the other hand, it is assumed that when the movement speed of the finger with which the tapping operation is carried out is higher than the predetermined speed, the area located in the position which the finger contacts is not selected, but the area which has been focused right before the contact of the finger is selected. That is to say, the area 206*b* which the finger contacts is not regarded as being selected, but an area 206*a* which has been focused right before the contact of the finger is regarded as being selected.

More specifically, the processing determining portion 140 of the information processor 100 determines whether or not the finger is located in the proximate detection area in accordance with the position information acquired by the position information acquiring portion 120 (S200). When it is determined in S200 that the finger is not located in the proximate detection area (NO), processing in Step S200 is repetitively executed. On the other hand, when it is determined in S200 that the finger is located in the proximate detection area (YES), the processing determining portion 140 causes the display changing portion 160 to focus the area of the object 206 corresponding to the position of the finger (S210).

After that, the processing determining portion 140 determines whether or not the finger has come in contact with the display surface of the displaying portion 114 (S220). When it is determined in Step S220 that the finger has not come in contact with the display surface (NO), the three pieces of processing from S200 to S220 are repetitively executed. On the other hand, when it is determined in Step S220 that the finger has come in contact with the display surface (YES), the processing determining portion 140 determines whether or not the measurement speed of the finger the information on which is acquired by the movement speed acquiring portion 130 is higher than the predetermined speed (threshold value)(S230). Also, when it is determined in Step S230 that the measurement speed of the finger is higher than the predetermined speed (YES), as shown in a top right part of FIG. 17, the area which has been focused right before the contact of the finger is regarded as being selected (S240). That is to say, the area to be selected is corrected from the area corresponding to the position with which the finger comes in contact to the area which has been focused right before the contact of the finger, and the function associated with the area concerned is carried out. Here, the area which has been focused right before the contact of the finger means the area corresponding to the position which has been detected right before the contact of the finger when the proximate distance from the display surface to the finger can be detected, and means the area corresponding to the position of the finger when the finger has entered the proximate detection area when the proximate distance cannot be detected.

On the other hand, when it is determined in Step S230 that the movement speed of the finger is equal to or lower than the predetermined speed (NO), as shown in a bottom right part of FIG. 17, the area corresponding to the position with which the finger comes in contact is selected (S250). As a result, when the manipulation is carried out for the GUI having a much smaller size than that of the finger, the user slowly taps the object with his/her finger, whereby it becomes possible to precisely select the desired area.

Execution of Processing Corresponding to Direction of Tap

The information processor 100 of the first embodiment can acquire information on the position of the finger with respect to the display surface of the displaying portion 114 by using the position information acquiring portion 120. Then, information on the direction in which the display surface is tapped with the finger may be acquired from the position information, and the processing to be executed may be determined in accordance with the direction in which the display surface is tapped with the finger.

Figure 19:
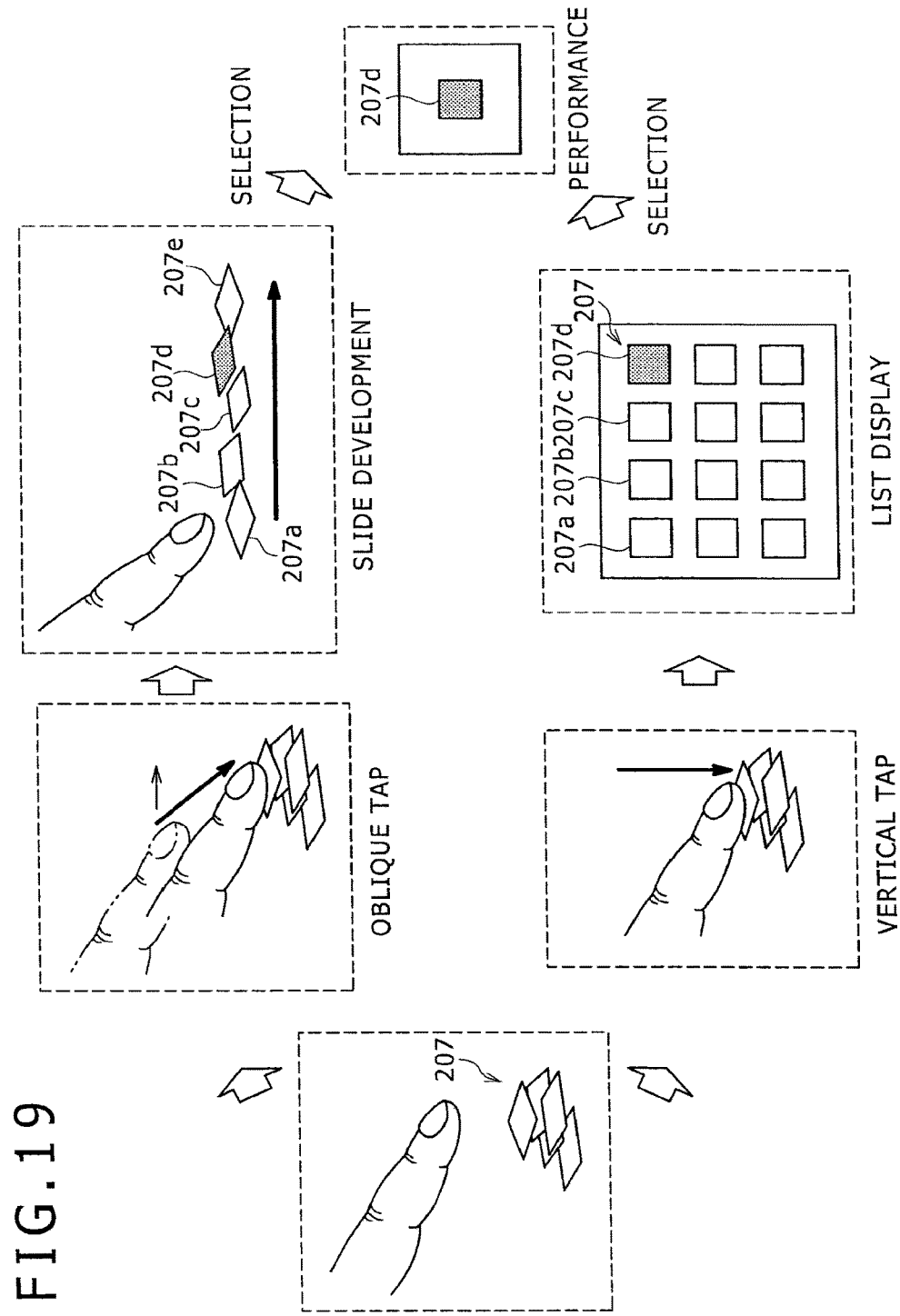
FIG. 19 is an explanatory view explaining an example of processing for acquiring information on a direction in which a user taps the display surface with his/her finger from the position information, and determining processing to be executed in accordance with the tapping direction.

For example, as shown in FIG. 19, it is assumed that an object group 207 composed of pile-shaped objects 207*a*, 207*b*, . . . is displayed on the displaying portion 114. For the purpose of confirming the contacts with the objects 207*a*, 207*b*, . . . composing the object group 207, it is necessary to develop the object group 207. In this case, however, how to develop the object group 207 can be changed in accordance with the tap direction of the finger for manipulation of the object group 207.

For example, when the user taps the object group 207 with his/her finger while he/she obliquely moves his/her finger, the object group 207 is developed into the pile-shaped objects 207*a*, 207*b*, . . . which are piled one upon another along the movement direction of the finger so as for the pile-shaped objects 207*a*, 207*b*, . . . to be slid (slide development). Also, when one object (for example, the object 207*d*) is selected from the object group 207 thus developed through the tapping operation, the processing associated with the object 207 is executed.

On the other hand, when the user taps the object group 207 with his/her finger by moving his/her finger in the direction approximately vertical to the display surface of the displaying portion 114, the objects 207*a*, 207*b*, . . . composing the object group 207 are displayed in the form of a list so that all of the objects 207*a*, 207*b*, . . . can be visualized for the user. Also, when one object (for example, the object 207*d*) is selected from the object group 207 displayed in the form of the list through the tapping operation similarly to the case of the slide development, the processing associated with the object 207*d* is executed.

In such a way, how to develop the object group 207 is changed in accordance with the movement direction of the finger with which the user taps the object group 207, whereby the object group 207 can be developed without an unpleasant sensation for the user.

In addition, when the object group developed through the slide development as shown in FIG. 19 is further associated with plural objects, the objects lying in a lower hierarchy may be slide-developed in accordance with the measurement direction of the finger with which the objects lying in an upper hierarchy are tapped. It is assumed that as shown in a state (A) of FIG. 20, an object group 208 composed of plural objects 208a, 208b, . . . is developed in a line. At this time, when the user taps the object 208a with his/her finger while he/she obliquely moves his/her finger, as shown in a state (B) of FIG. 20, objects a1, a2, and a3 which lie in a lower hierarchy with respect to the object 208a are developed along the movement direction of the finger. As a result, the object group 208 can be developed without an unpleasant sensation for the user.

Selection of Object Corresponding to Movement Speed of Finger

The information processor 100 of the first embodiment can acquire information on a movement speed as well of the finger when the finger is released from the display surface of the displaying portion 114 similarly to the case where the information on the movement speed of the finger when the display surface is tapped with the finger is acquired. The display expression in the phase of selection of the desired object can be changed by utilizing the movement speed of the finger when the finger is released from the display surface, and thus the user can be notified of the selection state of the desired object in the expression which is visually easy-to-follow.

Figure 21:
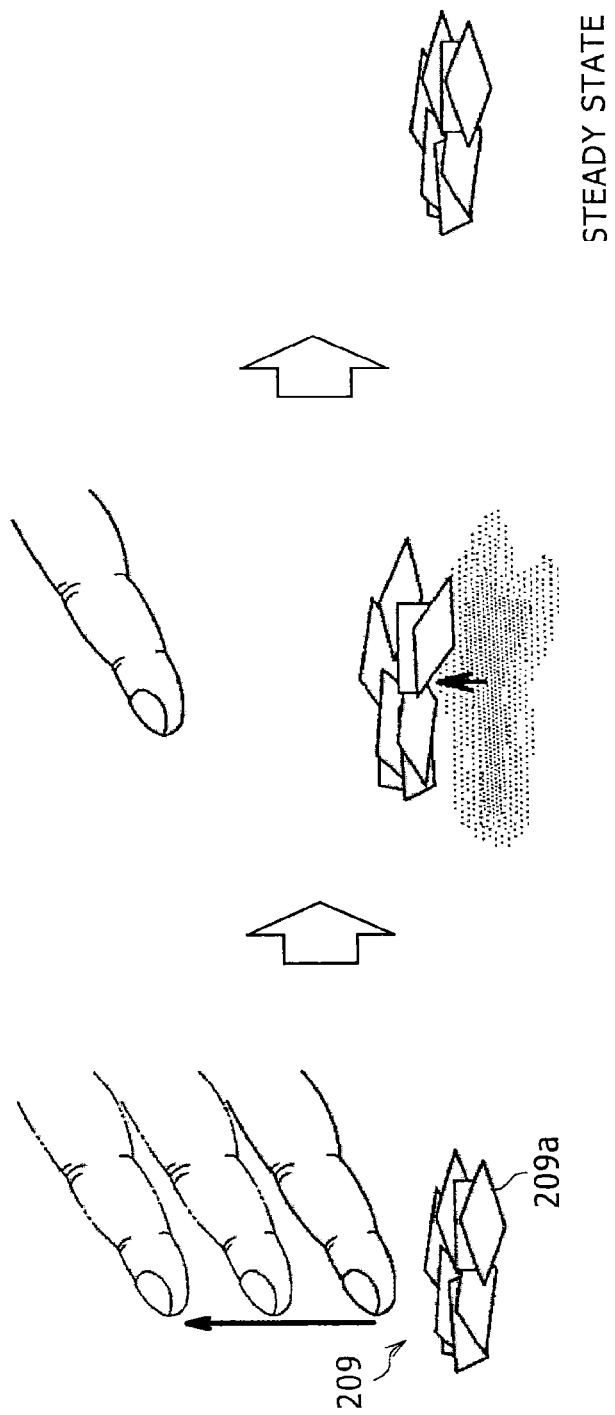
FIG. 21 is an explanatory view explaining an example of processing for changing a display expression in a phase of selection of the object by utilizing the movement speed of the finger when the finger is released from the display surface.

For example, it is considered that the object is set in the selection state when the movement speed of the finger in the phase of release of the finger from the display surface is higher than the predetermined speed. As shown in FIG. 21, it is assumed that an object group 209 composed of plural objects 209a is displayed on the displaying portion 114. The user release his/her finger from the display surface of the displaying portion 114 at the speed higher than the predetermined speed, thereby making it possible to collectively select the object group 209. That is to say, when the movement speed of the finger is equal to or lower than the predetermined speed, the object group 209 is not set in the selection state. As shown in FIG. 21, the processing determining portion 140 causes the display changing portion 160 to display such a state so that after a lapse of predetermined time, the floating object group 209 returns back to the original steady state after it has caused the display changing portion 160 to express such a state so that the object group 209 floats so as to follow the releasing operation of the finger.

On the other hand, when the movement speed of the finger is higher than the predetermined speed, as shown in FIG. 22, the processing determining portion 140 causes the display changing portion 160 to express such a state so that the object group 209 floats along with the releasing operation of the finger. Also, even when the finger gets away from the proximate detection area, or a predetermined time elapses after the display state of the object group 209 was changed, the floating expression of the object group 209 is left as it is. By adopting such a fashion in which a wind or a wind pressure is expressed in the form of metaphor, the user can be visually notified of that the object group 209 is held in the selection state in an easy-to-understand manner.

In addition, contrary to the examples of FIGS. 21 and 22, when the movement speed of the finger when the finger is released from the display surface is equal to or lower than the predetermined speed, the object group 209 may be set in the selection state. In this case, fishing is expressed in the form of the metaphor. That is to say, when the movement speed of the finger is equal to or lower than the predetermined speed, as shown in FIG. 23, the processing determining portion 140 causes the display changing portion 160 to carry out the expression in such a way that the object group 209 floats along with the releasing operation of the finger. In addition, when the finger is released from the display surface, the object group 209 is also expressed so as to float from the position in the steady state and from the display surface. In such a way, the object group 209 is expressed in the floating state, whereby it is possible to show that the object group 209 is held in the selection state.

On the other hand, when the movement speed of the finger is higher than the predetermined speed, as shown in FIG. 24, the processing determining portion 140 causes the display changing portion 160 to carry out the expression in such a way that the object group 209 floats along with the releasing operation of the finger. After that, the processing determining portion 140 causes the display changing portion 160 to carry out the display in such a way that after a lapse of predetermined time, the floating object group 209 returns back to the original steady state. In such a way, the object group 209 is set in the selection state, and thus the user can be visually notified of that the object group 209 is held in the selection state in the easy-to-understand manner.

Note that, in the examples of FIGS. 21 to 24, for the purpose of releasing the selection state of the object group 209, for example, it is only necessary to carry out the manipulation inputting operation for causing the finger to come in contact with the object group 209 held in the selection state.

The description has been given so far with respect to the information processing method, using the additional information as to the movement speed of the finger, of the second embodiment executed by the information processor 100 of the first embodiment. In addition to the normal input manipulation, the movement speed of the finger can be acquired, whereby the display expression of the GUI can be changed in accordance with the movement speed of the finger. As a result, the user can be made to recognize the input manipulation recognized by the information processor 100 in the easy-to-understand manner. As a result, the feedback of the manipulation inputting operation made by the user himself/herself enhances the operability. In addition, the movement speed of the finger is changed so as to execute the processing corresponding to the input manipulation, which results in that it becomes possible to select the processing to be executed.

Although the preferred embodiments of the present disclosure have been described in detail so far with reference to the accompanying drawings, the present disclosure is by no means limited thereto. It is obvious that a person who has the normal knowledge in the field of the technique to which the present disclosure belongs can think various changes and modifications within the category of the technical idea described in the appended claims, and it is understood that the various changes and modifications naturally belong to the technical scope of the present disclosure.

For example, although in the embodiments described above, it is determined whether or not the movement speed of the finger is higher than one threshold value (predetermined speed) about the speed, and the processing to be executed is determined in accordance with the determination result, the present disclosure is by no means limited thereto. For example, plural threshold values may be provided, and the processing to be executed may be determined in accordance with the magnitude of the movement speed of the finger with respect to each of the threshold values.

What is claimed is:

1. An information processing apparatus comprising:
   circuitry configured to
   identify a position of a manipulation body in relation to a detector and a distance between the detector and the manipulation body based on an output of the detector;
   identify a first object of a plurality of objects to be selected by the user and displayed on a display;
   determine a change in distance between the manipulation body and the detector over a predetermined period of time based on the output of the detector after the first object has been identified on the display; and
   cause the display to indicate that the first object is placed in a selected state by modifying a visual appearance of the first object by causing the display to change the visual depth of the first object based on the determined change in distance between the manipulation body and the detector over the predetermined period of time, wherein
   modifying the visual appearance of the first object includes modifying the visual appearance of the first object so that a visual depth of the first object appears to sink into the display, while a visual depth of the other of the plurality of objects is unchanged.

2. The information processing apparatus of claim 1, wherein
   the plurality of objects are initially displayed on the display to visually appear on a same parallel surface.

3. The information processing apparatus of claim 1, wherein
   the circuitry is configured to control the display to change a form or shape of the first object when the change in distance between the manipulation body and the detector over the predetermined period of time is greater than a threshold value.

4. The information processing apparatus of claim 1, wherein the circuitry is configured to:
   cause the display to change the visual depth of the first object when the change in distance between the manipulation body and the detector over the predetermined period of time is greater than a threshold value; and
   cause the display to not change the visual depth of the first object when the change in distance between the manipulation body and the detector over the predetermined period of time is less than the threshold value.

5. The information processing apparatus of claim 4, wherein
   the circuitry is configured to compare the determined change in distance between the manipulation body and the detector over the predetermined period of time to the threshold value.

6. The information processing apparatus of claim 1, wherein
   the circuitry is configured to execute a process corresponding to the first object when the change in distance between the manipulation body and the detector over the predetermined period of time is greater than a threshold value.

7. The information processing apparatus of claim 1, wherein
   the circuitry is configured to control the display to display information related to the first object when the change in distance between the manipulation body and the detector over the predetermined period of time is greater than a threshold value.

8. The information processing apparatus of claim 1, wherein
   the circuitry is configured to identify the first object of the plurality of objects displayed on the display to be in the selected state based on the determined change in distance between the manipulation body and the detector over the predetermined period of time.

9. The information processing apparatus of claim 8, wherein
   the circuitry is configured to control the display to indicate that the first object is placed in the selected state when the change in distance between the manipulation body and the detector over the predetermined period of time is greater than a threshold value.

10. The information processing apparatus of claim 9, wherein
    the circuitry is configured to cause the first object to not be placed in the selected state when the change in distance between the manipulation body and the detector over the predetermined period of time is less than the threshold value.

11. The information processing apparatus of claim 1, wherein
    the detector is configured to detect movement of a manipulation body in an oblique direction in relation to the detector, and
    the circuitry is configured to determine a process to be executed based on whether the detected movement of the manipulation body is in a vertical or oblique direction in relation to the detector.

12. The information processing apparatus of claim 1, wherein the circuitry is configured to:
    cause the display to change the information displayed by the display from displaying the plurality of objects to displaying a new object that is different from the plurality of objects after the visual appearance of the first object has been modified.

13. An information processing method performed by an information processing apparatus, the method comprising:
    identifying a position of a manipulation body in relation to a detector and a distance between the detector and the manipulation body based on an output of the detector;
    identifying a first object of a plurality of objects to be selected by the user and displayed on a display;
    determining a change in distance between the manipulation body and the detector over a predetermined period of time based on the output of the detector after the first object has been identified on the display; and
    causing the display to indicate that the first object is placed in the selected state by modifying a visual appearance of the first object by causing the display to change the visual depth of the first object based on the determined change in distance between the manipulation body and the detector over the predetermined period of time, wherein
    modifying the visual appearance of the first object includes modifying the visual appearance of the first object so that a visual depth of the first object appears to sink into the display, while a visual depth of the other of the plurality of objects is unchanged.

14. The information processing method of claim 13, wherein the causing includes:
    causing the display to change the visual depth of the first object when the change in distance between the manipulation body and the detector over the predetermined period of time is greater than a threshold value; and causing the display to not change the visual depth of the first object when the change in distance between the manipulation body and the detector over the predetermined period of time is less than the threshold value.

15. A non-transitory computer-readable medium including computer program instructions, which when executed by an information processing apparatus, cause the information processing apparatus to:

identify a position of a manipulation body in relation to a detector and a distance between the detector and the manipulation body based on an output of the detector;

identify a first object of a plurality of objects to be selected by the user and displayed on a display;

determine a change in distance between the manipulation body and the detector over a predetermined period of time based on the output of the detector after the first object has been identified on the display; and cause the display to indicate that the first object is placed in the selected state by modifying a visual appearance of the first object by causing the display to change the visual depth of the first object based on the determined change in distance between the manipulation body and the detector over the predetermined period of time, wherein modifying the visual appearance of the first object includes modifying the visual appearance of the first object so that a visual depth of the first object appears to sink into the display, while a visual depth of the other of the plurality of objects is unchanged.

16. The non-transitory computer-readable medium of claim 15, wherein the causing includes:

causing the display to change the visual depth of the first object when the change in distance between the manipulation body and the detector over the predetermined period of time is greater than a threshold value; and causing the display to not change the visual depth of the first object when the change in distance between the manipulation body and the detector over the predetermined period of time is less than the threshold value.

* * * * *